United States Patent
Mun et al.

(10) Patent No.: US 12,174,367 B2
(45) Date of Patent: *Dec. 24, 2024

(54) META OPTICAL DEVICE AND ELECTRONIC APPARATUS INCLUDING THE SAME

(71) Applicant: SAMSUNG ELECTRONICS CO., LTD., Suwon-si (KR)

(72) Inventors: Sangeun Mun, Seoul (KR); Hyeonsoo Park, Seoul (KR); Hyunsung Park, Suwon-si (KR); Seunghoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,167

(22) Filed: Jun. 28, 2023

(65) Prior Publication Data

US 2023/0341675 A1  Oct. 26, 2023

Related U.S. Application Data

(63) Continuation of application No. 17/174,703, filed on Feb. 12, 2021, now Pat. No. 11,726,310.

(30) Foreign Application Priority Data

Sep. 17, 2020  (KR) .................. 10-2020-0120029

(51) Int. Cl.
   *G02B 26/06*  (2006.01)
   *G02B 1/00*   (2006.01)

(52) U.S. Cl.
   CPC ............. *G02B 26/06* (2013.01); *G02B 1/002* (2013.01); *G02B 2207/101* (2013.01)

(58) Field of Classification Search
   CPC ... G02B 26/06; G02B 1/002; G02B 2207/101
   (Continued)

(56) References Cited

U.S. PATENT DOCUMENTS

| 6,442,312 B1 | 8/2002 | Terao et al. |
| 9,103,973 B2 | 8/2015 | Fattal et al. |

(Continued)

FOREIGN PATENT DOCUMENTS

| CN | 109901251 A  | 6/2019 |
| JP | 2007-304621 A | 11/2007 |

(Continued)

OTHER PUBLICATIONS

Communication dated Aug. 27, 2021, issued by the European Patent Office in counterpart European Application No. 21160808.8.

(Continued)

*Primary Examiner* — William Choi
(74) *Attorney, Agent, or Firm* — Sughrue Mion, PLLC

(57) ABSTRACT

A meta-optical device includes a plurality of phase modulation areas configured to modulate a phase of an incident light, each of the plurality of phase modulation areas including a plurality of nanostructures having a shape and an arrangement that are determined according to a respective rule set for each of the plurality of phase modulation areas; and a compensation area located between a $k^{th}$ phase modulation area and a $(k+1)^{th}$ phase modulation area adjacent to each other, from among the plurality of phase modulation areas, and including a compensation structure for buffering an effective refractive index change occurring in a boundary area between the $k^{th}$ phase modulation area and the $(k+1)^{th}$ phase modulation area according to respective rules of the $k^{th}$ phase modulation area and the $(k+1)^{th}$ phase modulation area, wherein N is a number of the plurality of phase (Continued)

modulation areas, k and N are natural numbers, and k is equal to or greater than 1 and less than N.

20 Claims, 33 Drawing Sheets

(58) Field of Classification Search
USPC .......................................................... 359/290
See application file for complete search history.

(56) References Cited

U.S. PATENT DOCUMENTS

| | | | |
|---|---|---|---|
| 11,726,310 B2* | 8/2023 | Mun ...................... | G02B 26/06 359/290 |
| 2006/0061708 A1 | 3/2006 | Umebayashi et al. | |
| 2014/0044392 A1 | 2/2014 | Fattal et al. | |
| 2017/0212285 A1 | 7/2017 | Arbabi et al. | |
| 2017/0219739 A1 | 8/2017 | Lin et al. | |
| 2018/0216797 A1 | 8/2018 | Khorasaninejad et al. | |
| 2019/0113727 A1 | 4/2019 | Tamma | |
| 2020/0174163 A1 | 6/2020 | Han et al. | |

FOREIGN PATENT DOCUMENTS

| | | |
|---|---|---|
| JP | 4393252 B2 | 1/2010 |
| KR | 10-0349045 B1 | 11/2002 |
| WO | 2012/144997 A1 | 10/2012 |

OTHER PUBLICATIONS

Jacob Engelberg et al., "Near-IR wide-field-of-view Huygens metalens for outdoor imaging applications", Nanophotonics, Jul. 24, 2019, vol. 9, No. 2, pp. 361-370 (10 pages total).

* cited by examiner

META OPTICAL DEVICE AND ELECTRONIC APPARATUS INCLUDING THE SAME

CROSS-REFERENCE TO RELATED APPLICATION

This application is a continuation of U.S. Ser. No. 17/174,703, filed Feb. 12, 2021, which claims priority from Korean Patent Application No. 10-2020-0120029, filed on Sep. 17, 2020, in the Korean Intellectual Property Office, the disclosure of which is incorporated by reference herein in its entirety.

BACKGROUND

1. Field

Apparatuses and methods consistent with example embodiments relate to a meta-optical device and an electronic device including the same.

2. Description of the Related Art

A flat diffraction device including a meta-structure may exhibit various optical effects that conventional refraction devices may not achieve. Thus, such a flat diffraction device may be used to implement a thin optical system, and accordingly, interests in using a thin optical system in many fields have increased.

The meta-structure includes a nanostructure in which a value less than the wavelength of incident light is applied to shape, period, etc. The nanostructure is designed such that a phase profile set for each position for light of a desired wavelength band is satisfied in order to obtain the desired optical performance. When discontinuity appears in the phase profile, light diffraction occurs in an unintended direction, thereby lowering light efficiency.

SUMMARY

One or more example embodiments provide meta-optical devices with improved diffraction efficiency.

Further, one or more example embodiments Provided are electronic devices using a meta-optical device.

Additional aspects will be set forth in part in the description which follows and, in part, will be apparent from the description, or may be learned by practice of the presented embodiments of the disclosure.

According to an aspect of an embodiment, there is provided a meta-optical device including: a plurality of phase modulation areas arranged in a first direction and configured to modulate a phase of an incident light, each of the plurality of phase modulation areas comprising a plurality of nanostructures having a shape and an arrangement that are determined according to a respective rule set for each of the plurality of phase modulation areas; and a compensation area located between a $k^{th}$ phase modulation area and a $(k+1)^{th}$ phase modulation area adjacent to each other, from among the plurality of phase modulation areas, and comprising a compensation structure for buffering an effective refractive index change occurring in a boundary area between the $k^{th}$ phase modulation area and the $(k+1)^{th}$ phase modulation area according to respective rules of the $k^{th}$ phase modulation area and the $(k+1)^{th}$ phase modulation area, wherein N is a number of the plurality of phase modulation areas, k and N are natural numbers, and k is equal to or greater than 1 and less than N.

The $k^{th}$ phase modulation area and the $(k+1)^{th}$ phase modulation area may be configured to modulate the phase of the incident light to have a same sign of a phase change slope according to a position in the first direction.

Among the plurality of nanostructures in the $k^{th}$ phase modulation area, a width of a nanostructure closest to the compensation area in the first direction is $w_a$, among the plurality of nanostructures in the $(k+1)^{th}$ phase modulation area, a width of a nanostructure closest to the compensation area in the first direction is $w_b$, and a width $w_c$ of the compensation structure is between $w_a$ and $w_b$.

The compensation structure may include two or more compensation structures having a same width in the first direction and arranged in the first direction.

The compensation structure may include two or more compensation structures arranged in the first direction, and widths of the two or more compensation structures may gradually change with a pattern of change from $w_a$ to $w_b$ in the first direction.

The plurality of phase modulation areas may have a circular shape or an annular shape surrounding the circular shape, and the first direction may be a radial direction that extends from a center of the circular shape toward a boundary of the meta-optical device.

When the plurality of phase modulation areas are $m^{th}$ areas, and m is greater than or equal to 2 and increases from 2 to N in an order from the center, all of the $m^{th}$ areas have a phase modulation range of a first phase to a second phase in the radial direction, and the first phase and the second phase may be different from each other and may be between $-2\pi$ and $2\pi$.

A difference between the first phase and the second phase may be $2\pi$ or less.

Widths of the plurality of phase modulation areas in the radial direction may decrease in a direction from the center to the boundary of the meta-optical device.

The compensation area may include a plurality of compensation areas, and widths of the plurality of compensation areas that are arranged in the radial direction may have a same value or decrease in a direction from the center to the boundary of the meta-optical device.

The compensation area may include a plurality of compensation areas, and in a phase modulation area and a compensation area at a position adjacent to each other, from among the plurality of phase modulation areas and the plurality of compensation areas, a ratio of a width of the compensation area to a width of the phase modulation area may increase in a direction from the center to the boundary of the meta-optical device.

The ratio may be 25% or less.

The compensation area may include a plurality of compensation areas, and a ratio of a number of the plurality of compensation areas to a number of the plurality of phase modulation areas may be 50% or more.

When a radius of the meta-optical device is R, a distance of the compensation area from the center may be greater than R/2.

When an incident angle of the incident light is $\theta$, the compensation area may be provided at a position where $\theta$ is greater than or equal to 30°.

Each of the plurality of nanostructures and the compensation structure may have a pillar shape.

The meta-optical device may further include: a substrate configured to support the plurality of nanostructures and the compensation structure; and a surrounding material layer covering the plurality of nanostructures and the compensation structure and having a refractive index different from refractive indices of the plurality of nanostructures and the compensation structure.

The meta-optical device may further include a substrate and a surrounding material layer arranged on the substrate, and each of the plurality of nanostructures and the compensation structure may have a hole shape such that the surrounding material layer is engraved.

The plurality of nanostructures and the compensation structure may be arranged in a multilayer structure stacked in a second direction perpendicular to the first direction.

The plurality of nanostructures may include a plurality of first nanostructures arranged on a first layer and a plurality of second nanostructures arranged on a second layer, and the compensation structure may include a first compensation structure arranged on the first layer and a second compensation structure arranged on the second layer.

When viewed from the second direction, the first compensation structure and the second compensation structure may be arranged to be offset with respect to each other in the first direction.

A length in the first direction in which the first compensation structure and the second compensation structure are offset from each other may increases as a position of the compensation area becomes farther away from the center.

The meta-optical device may further include: a substrate configured to support the plurality of first nanostructures and the first compensation structure; and a first surrounding material layer filling an area between the plurality of first nanostructures and the first compensation structure on the substrate and having a refractive index different from refractive indices of the plurality of first nanostructures and the first compensation structure.

The meta-optical device may further include: a second surrounding material layer filling an area between the plurality of second nanostructures and the second compensation structure on the first surrounding material layer and having a refractive index different from refractive indices of the plurality of second nanostructures and the second compensation structure.

The meta-optical device may further include a second surrounding material layer arranged on the substrate, and each of the plurality of second nanostructures and the second compensation structure may have a hole shape such than the second surrounding material layer is engraved.

When a center wavelength of the incident light is $\lambda_0$, heights of the plurality of nanostructures and the compensation structure may be greater than $\lambda_0/2$ and less than $4\lambda_0$.

The meta-optical device may be a lens.

Widths of the plurality of phase modulation areas in the first direction may have an equal value.

The meta-optical device may be a beam deflector.

The meta-optical device may be a beam shaper.

The incident light may have an infrared wavelength or a visible light wavelength.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
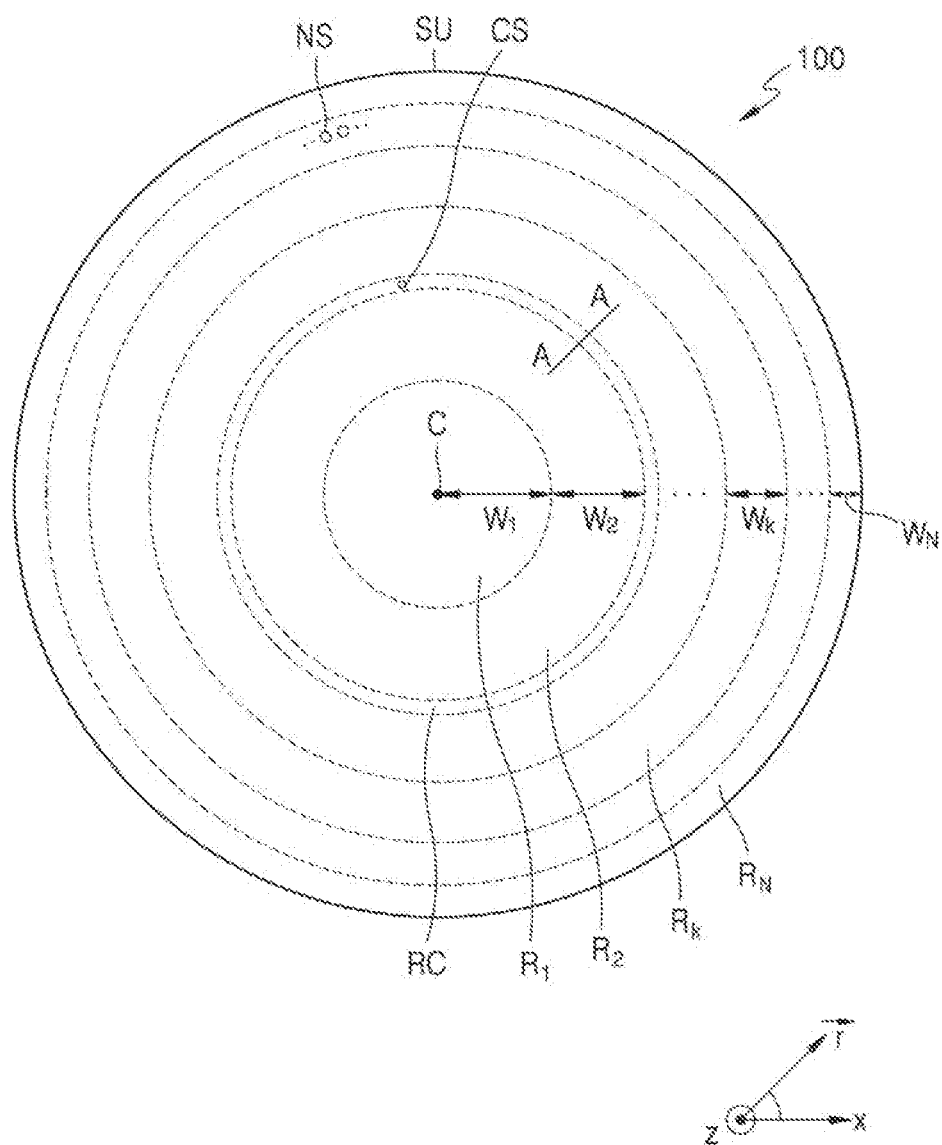
FIG. 1 is a plan view of a schematic configuration of a meta-optical device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, embodiments will be described in detail with reference to the accompanying drawings. The embodiments described below are only examples, and thus, it should be understood that the embodiments may be modified in various forms. The same reference numerals refer to the same elements throughout. In the drawings, the sizes of constituent elements may be exaggerated for clarity.

For example, when an element is referred to as being "on" or "above" another element, it may be directly on the other element, or intervening elements may also be present.

It will be understood that, although the terms "first," "second," etc. may be used herein to describe various elements, these elements should not be limited by these terms. These terms are used only to differentiate an element from another element. These terms do not limit the material or structure of the components.

As used herein, the singular forms "a," "an," and "the" are intended to include the plural forms as well, unless the context clearly indicates otherwise. In addition, it will be understood that when a unit is referred to as "comprising" another element, it does not preclude the possibility that one or more other elements may exist or may be added.

In addition, the terms "-er", "-or", and "module" described in the specification mean units for processing at least one function and/or operation and can be implemented by hardware components or software components and combinations thereof.

The use of the terms "a," "an," and "the" and similar referents is to be construed to cover both the singular and the plural.

Operations constituting a method may be performed in any suitable order unless explicitly stated that they should be performed in the order described. Further, the use of any and all examples, or exemplary language (e.g., "such as") provided herein, is intended merely to better illuminate the inventive concept and does not pose a limitation on the scope of the present disclosure unless otherwise claimed.

FIG. 1 is a plan view of a schematic configuration of a meta-optical device according to an embodiment.

A meta-optical device 100 modulates a phase of incident light in a certain wavelength band, and includes a plurality of nanostructures NS. The certain wavelength band may be a visible light band, an infrared band, or a band including both. A nanostructure NS may be disposed on a substrate SU, and in FIG. 1, only a few nanostructures NS are exemplified for convenience. The nanostructure NS has a shape dimension of a sub-wavelength less than a center wavelength $\lambda_0$ of the certain wavelength band, and has a refractive index different from those of the substrate SU and other surrounding materials. A detailed example of the nanostructure NS will be described in FIGS. 21A and 21B. The meta-optical device 100 may implement various phase profiles for incident light according to the arrangement of the nanostructures NS.

The meta-optical device 100 includes a plurality of phase modulation areas including a plurality of nanostructures NS whose shape and arrangement are determined according to respective rules. The plurality of phase modulation areas may be arranged in a certain direction defining a phase profile, and this direction may be a radial direction r extending from a center C of the meta-optical device 100 to an outer boundary of the meta-optical device 100 as shown in FIG. 1. However, the present disclosure is not limited thereto.

The nanostructure NS may be disposed on the substrate SU, and in FIG. 1, only a few nanostructures NS are exemplified for convenience. The plurality of phase modulation areas will be referred to as a first area $R_1$, a second area $R_2$, an $N^{th}$ area $R_N$, etc. in an order from the center C of the meta-optical device 100 in the radial direction r. As illustrated, the first area $R_1$ may be a circular area, and the second area $R_2$ to the $N^{th}$ area $R_N$ may be annular areas.

A compensation area RC may be provided between a $k^{th}$ area $R_k$ and a $(k+1)^{th}$ area $R_{k+1}$ (k is a natural number between 1 and N) adjacent to each other, from among the plurality of phase modulation areas. The compensation area RC is illustrated as one area, but is not limited thereto, and may be further provided at a position between the other two phase modulation areas. When rules of the first area $R_1$ to the $N^{th}$ area $R_N$ are set in order for the meta-optical device 100 to implement a desired phase profile, the compensation area RC is an area that buffers a sudden change in phase or a sudden change in effective refractive index occurring in a boundary area between two areas according to the respective rules of the two areas. The compensation area RC provides a compensation structure CS having a shape and an arrangement suitable for this function is provided. The compensation structure CS has a shape dimension of a sub-wavelength and has a refractive index different from that of a surrounding material. The detailed shape and arrangement of the compensation structure CS will be described in detail later in FIG. 3.

Rules set in each area of the meta-optical device 100 are applied to parameters such as shape, size (width and height), spacing, and arrangement of the nanostructure NS, and are set according to a phase profile that the meta-optical device 100 wants to implement as a whole.

When light enters the meta-optical device 100 in a z direction (e.g., a direction perpendicular to a surface plane of the substrate SU on which the nanostructure NS is disposed) and passes through the meta-optical device 100, the light encounters refractive index distribution according to an arrangement of the plurality of nanostructures NS having a refractive index greater than 1. A position of a wavefront connecting points of the same phase in an optical path is different before and after undergoing a refractive index distribution according to the arrangement of the nanostructures NS, which is expressed as a phase delay. The degree of phase delay is different according to each position that is a variable of the refractive index distribution, that is, a position (x and y coordinates) on a plane perpendicular to a light traveling direction (z direction) at a position immediately after light passes through the nanostructures NS of the meta-optical device 100. When the arrangement of the nanostructures NS has polar symmetry or has rotational symmetry at a certain angle with respect to a z-axis, a phase profile may be expressed as a function of the distance r from the center C. This phase profile appears differently depending on the detailed shape and arrangement of the nanostructures NS constituting the meta-optical device 100. In other words, the detailed shape and arrangement of the nanostructures NS set for each position may be determined according to a desired phase profile.

In the following, expressions such as phase delay, phase modulation, and phase may be used interchangeably, and all of these expressions refer to a relative phase based on before undergoing the refractive index distribution formed by the nanostructures NS at a position immediately after light passes through the nanostructures NS.

A specific example of the arrangement of the nanostructures NS in the meta-optical device 100 described below is related to a case where the meta-optical device 100 functions as a lens, but embodiments are not limited thereto. In a case in which the metal-optical device 100 functions as a lens, the meta-optical device 100 may be referred to as a meta lens.

The first area $R_1$ to the $N^{th}$ area $R_N$ are areas exhibiting a phase delay of a certain range, and a phase modulation range of the second area $R_2$ to the $N^{th}$ area $R_N$ may be the same. The phase modulation range may be $2\pi$ radians or less. A phase modulation range of the first area $R_1$ may be $2\pi$ radians or less. All of the first to $N^{th}$ areas $R_1$ to $R_N$ may be referred to as $2\pi$ zones.

The function of each area, and the number N or widths $W_1, \ldots W_K, \ldots$ and $W_N$ of the areas may be major variables of the performance of the meta-optical device 100.

In order for the meta-optical device 100 to function as a lens, rules within each area are set so that the width of each area is not constant, and a direction of diffraction of incident light in each area is slightly different. The number of areas is related to the magnitude (an absolute value) of refractive power, and the sign of the refractive power may be determined according to the rules within each area. For example, positive refractive power may be implemented by an arrangement of rules in which the size of the nanostructures NS decreases in the radial direction in each area (an arrangement with decreasing phases), and negative refractive power may be implemented by an arrangement of rules in which the size of the nanostructures NS increases in the radial direction (an arrangement with increasing phases).

In order for the meta-optical device 100 to function as a beam deflector, rules within each area may be set such that the widths $W_1, \ldots W_K, \ldots$ and $W_N$ of each area ($R_1, R_2, \ldots,$ and $R_N$) are constant and incident light is diffracted in a certain and constant direction in each area.

In addition to a lens or a beam deflector, the meta-optical device 100 may function as a beam shaper having an arbitrary positional distribution.

In order for the above-described functions to appear efficiently within a desired wavelength band, discontinuities according to positions in a phase profile for this should not appear as much as possible. This is because, in a case of phase discontinuity, a portion of light passing through the meta-optical device 100 is diffracted in a direction other than a desired diffraction direction, and thus diffraction efficiency may be deteriorated.

However, because the phase modulation areas $R_1, \ldots R_k, \ldots$ and $R_N$ provided in the meta-optical device 100 modulate a phase of incident light in the same range and/or trend, discontinuity of a large phase difference basically exists at the boundary between adjacent areas. The meta-optical device 100 according to the embodiment has the compensation area RC capable of mitigating phase discontinuity at at least one of these positions.

Figure 2:
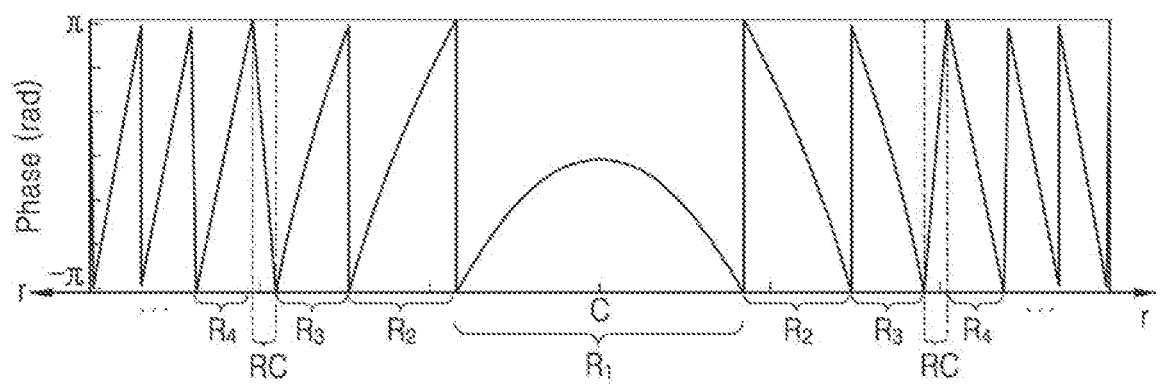
FIG. 2 is a graph showing an example of a phase profile of a meta-optical device according to an embodiment.

FIG. 2 is a graph exemplarily showing a phase profile of a meta-optical device according to an embodiment.

Referring to the graph, the second area $R_2$, the third area $R_3$, and the $N^{th}$ area $R_N$ have optical properties of changing a phase of an incident light from $\pi$ to $-\pi$ in a radial direction within each area. Therefore, discontinuity in which the phase changes steeply from $-\pi$ to $\pi$ is formed at the boundary of these areas. The compensation area RC located between two adjacent areas, that is, the $k^{th}$ area $R_k$ and the $(k+1)^{th}$ area $R_{k+1}$, is provided such that phase modulation occurs gradually from $-\pi$ to $\pi$. That is, adjacent areas with the compensation area RC therebetween, that is, the $k^{th}$ area $R_k$, the compensation area RC, and the $(k+1)^{th}$ area $R_{k+1}$ become areas without phase discontinuity.

Figure 3:
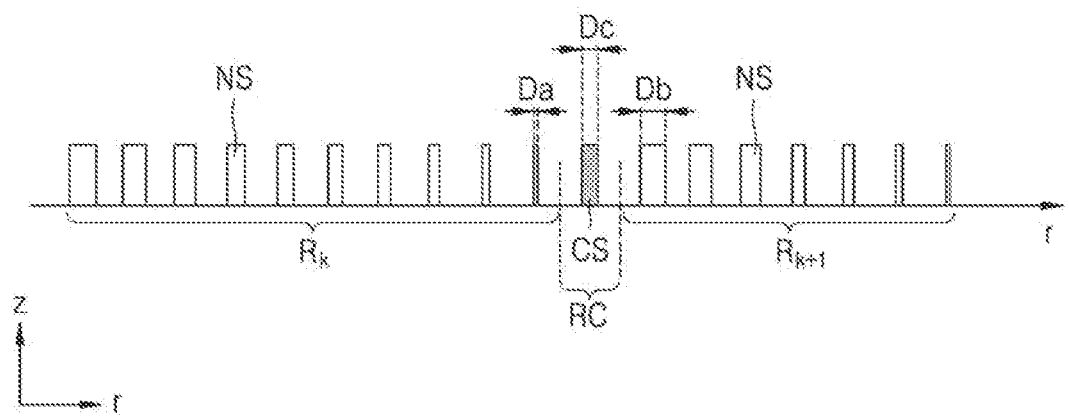
FIG. 3 is a cross-sectional view illustrating a partial area of a structure of a meta-optical device according to an embodiment.
Figure 4:
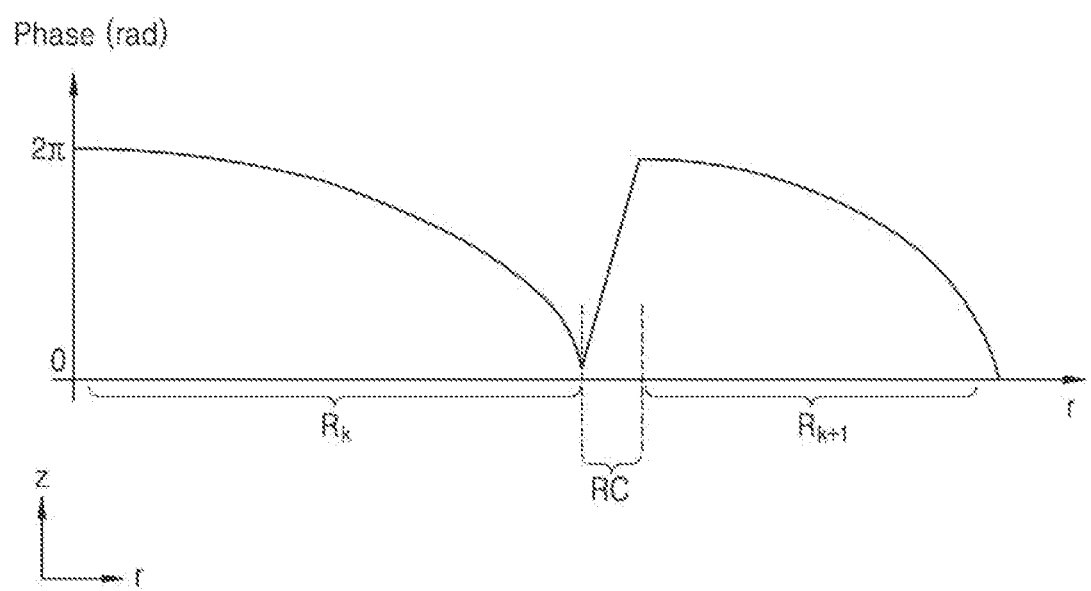
FIG. 4 is a graph showing a phase profile of light immediately after passing through the partial area shown in FIG. 3 according to an embodiment.

FIG. 3 is a cross-sectional view illustrating a structure of a meta-optical device according to an embodiment in detail in a partial area, and FIG. 4 is a graph showing a phase profile of light immediately after passing through the partial area shown in FIG. 3.

FIG. 3 shows an arrangement of the nanostructures NS in the $k^{th}$ area $R_k$, the compensation area RC, and the $(k+1)^{th}$ area $R_{k+1}$ in cross section A-A of FIG. 1.

Referring to FIG. 3, the width $D_c$ of the compensation structure CS has a value between $D_a$ and $D_b$ (e.g., a value greater than $D_a$ and less than $D_b$) when a width of the nanostructure NS closest to the compensation area RC among the nanostructures NS of the $k^{th}$ area $R_k$ in the radial direction r is $D_a$, and when a width of the nanostructure closest to the compensation area RC among the nanostructures NS of the $(k+1)^{th}$ area $R_{k+1}$ in the radial direction r is $D_b$.

By the compensation structure CS, a phase modulation value in the compensation area RC is an intermediate phase between a phase $-\pi$ at the end of the $k^{th}$ area $R_k$ and a phase $\pi$ at the start of the $(k+1)^{th}$ area $R_{k+1}$. Accordingly, phase discontinuity between two adjacent phase modulation areas, that is, the $k^{th}$ area $R_k$ and the $(k+1)^{th}$ area $R_{k+1}$, is alleviated. A phase modulation trend in the compensation area RC is opposite to that of the $k^{th}$ area $R_k$ and the $(k+1)^{th}$ area $R_{k+1}$ adjacent thereto. In the $k^{th}$ area $R_k$ and the $(k+1)^{th}$ area $R_{k+1}$, the phase gradually decreases in the radial direction, whereas in the compensation area RC, the phase increases in the radial direction. Therefore, for example, when the $k^{th}$ area $R_k$ and the $(k+1)^{th}$ area $R_{k+1}$ are modified in a form in which the phase gradually increases in the radial direction, in the compensation area RC, the phase decreases in the radial direction.

The alleviation of the phase discontinuity by the compensation area RC may be described in terms of an effective refractive index. The effective refractive index is a concept that assumes that a unit element of the meta-optical device 100 may be viewed as a uniform medium. A width of the nanostructure NS at the end of the $k^{th}$ area $R_k$ is the smallest among the nanostructures NS in the $k^{th}$ area $R_k$, and a width of the nanostructure NS at the start of the $(k+1)^{th}$ area $R_{k+1}$ is the largest among the nanostructures NS in the $(k+1)^{th}$ area $R_{k+1}$. Accordingly, when a significant and sudden change in the effective refractive index appears in the boundary area between the $k^{th}$ area $R_k$ and the $(k+1)^{th}$ area $R_{k+1}$, the compensation structure CS provided in the compensation area RC buffers such an effective refractive index change.

An effective refractive index change tendency in the compensation area RC is opposite to an effective refractive index change tendency in the $k^{th}$ area $R_k$ and the $(k+1)^{th}$ area $R_{k+1}$ adjacent thereto. In the $k^{th}$ area $R_k$ and the $(k+1)^{th}$ area $R_{k+1}$, the effective refractive index gradually decreases in the radial direction, whereas in the compensation area RC, the effective refractive index increases in the radial direction. Therefore, for example, when the $k^{th}$ area $R_k$ and the $(k+1)^{th}$ area $R_{k+1}$ are modified in a form in which the effective refractive index gradually increases in the radial direction, in the compensation area RC, the effective refractive index decreases in the radial direction r.

Figure 5:
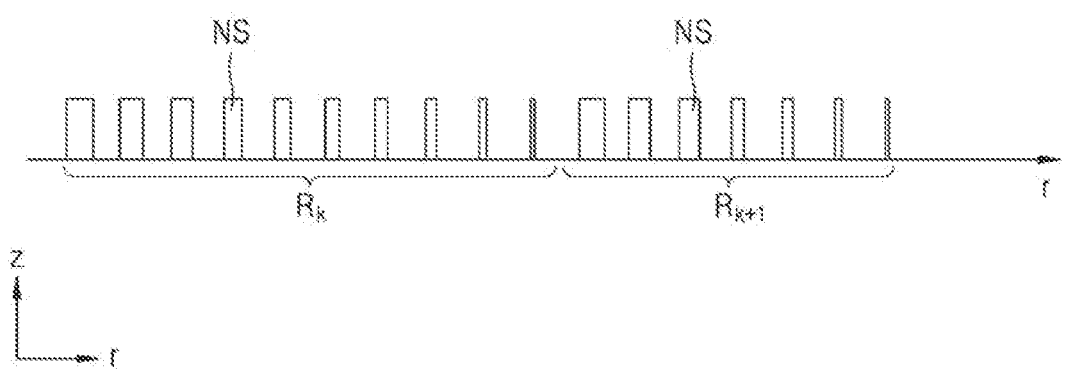
FIG. 5 is a cross-sectional view of an arrangement of nanostructures of a meta-optical device according to a comparative example.
Figure 6:
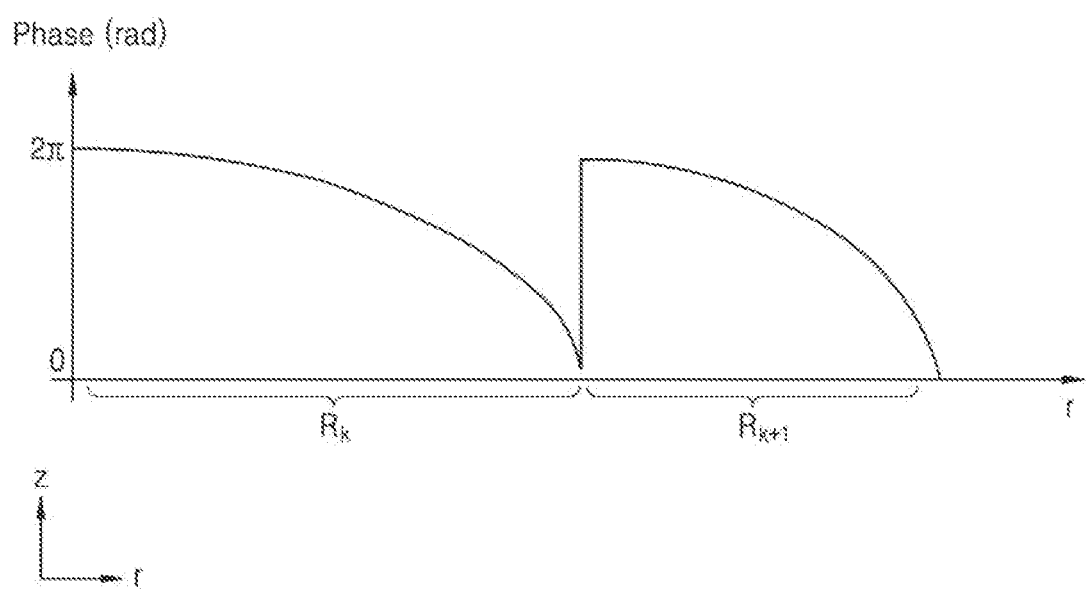
FIG. 6 is a graph showing a phase profile of light immediately after passing through the position of the nanostructure shown in FIG. 5 according to an embodiment.

FIG. 5 is a cross-sectional view illustrating a structure of a meta-optical device according to a comparative example in detail in a partial area, and FIG. 6 is a graph showing a phase profile of light immediately after passing through the partial area shown in FIG. 5.

The meta-optical device of the comparative example does not have a compensation area, that is, the meta-optical device of the comparative example is same as the meta-optical device of FIG. 1 except for the compensation area RC.

The $k^{th}$ area $R_k$ includes the nanostructures NS with a width gradually decreasing in the radial direction r, and the phase changes from $\pi$ to $-\pi$ in the radial direction. The $(k+1)^{th}$ area includes the nanostructures NS with a width gradually decreasing in the radial direction r, and the phase changes from $\pi$ to $-\pi$ in the radial direction again. In other words, an area between a location where the $k^{th}$ area $R_k$ ends and a location where the $(k+1)^{th}$ area $R_{k+1}$ starts is an area in which an effective refractive index changes rapidly, and the phase also shows discontinuity that changes rapidly from $-\pi$ to $\pi$.

Figure 7:
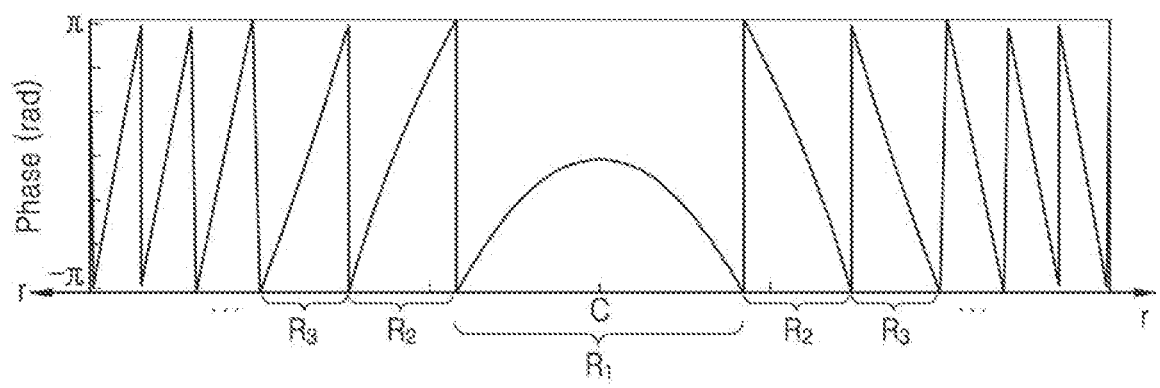
FIG. 7 is a graph showing a phase profile of a meta-optical device according to a comparative example.

FIG. 7 is a graph showing a phase profile of a meta-optical device according to a comparative example.

Referring to the graph, in all adjacent areas, such as the boundary between the first area $R_1$ and the second area $R_2$ provided in the meta-optical device, and the boundary between the second area $R_2$ and the third area $R_3$, phase discontinuity in which a phase rapidly changes occurs.

The phase discontinuity may lower diffraction efficiency intended by the meta-optical device, which is due to a shadowing effect due to discontinuous areas.

Figure 8:
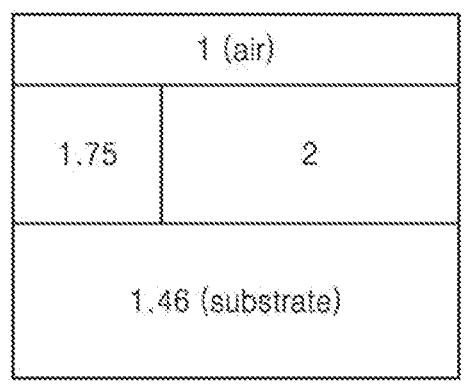
FIG. 8 is a view of a modeled refractive index distribution structure to computationally simulate the effect of phase discontinuity of a meta-optical device according to a comparative example.
Figure 9A:
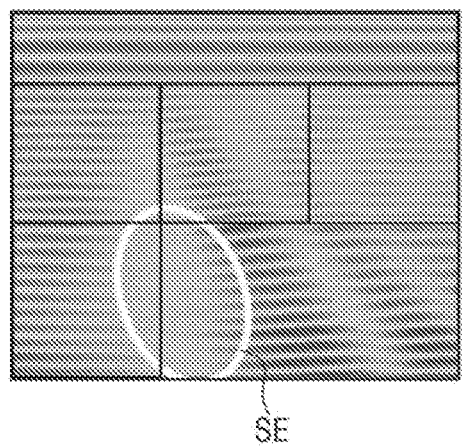
FIGS. 9A to 9C are views of a phase profile of light incident on the structure of FIG. 8 at an incident angle of 0, 30, and 45 degrees, respectively.
Figure 9B:
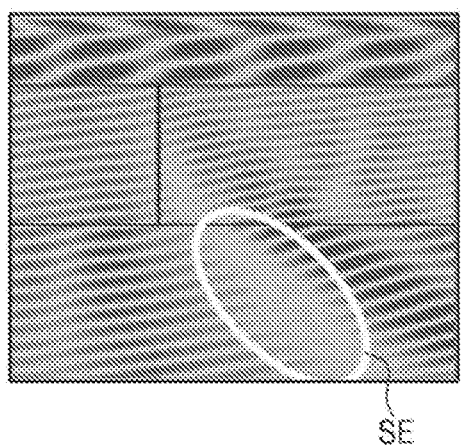
Figure 9C:
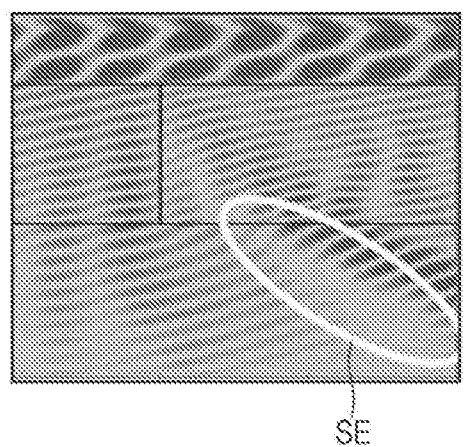

FIG. 8 is a view of a modeled refractive index distribution structure to computationally simulate the effect of phase discontinuity of a meta-optical device according to a comparative example. FIGS. 9A to 9C are views of a phase profile of light incident on the structure of FIG. 8 at an incident angle of 0, 30, and 45 degrees, respectively.

The refractive index distribution structure of FIG. 8 includes a refractive index distribution in which an effective refractive index changes steeply from 1.75 to 2 on a substrate having a refractive index of 1.46.

A wavefront of light that has undergone the steep change in the effective refractive index is not continuous, and exhibits a shadowing effect as indicated by reference SE in FIGS. 9A-9C. This effect is more pronounced as an incident angle increases.

Figure 10:
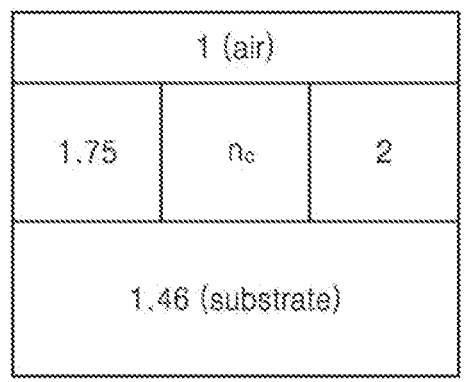
FIG. 10 is a view of a modeled refractive index distribution structure to computationally simulate a function of a compensation area provided in a meta-optical device according to an embodiment.
Figure 11A:
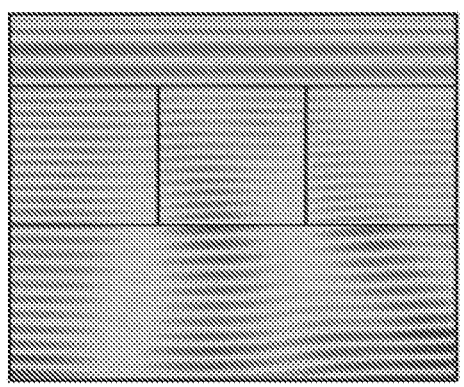
FIGS. 11A to 11C are views of a phase profile of light incident on the structure of FIG. 10 at an incident angle of 0, 30, and 45 degrees, respectively.
Figure 11B:
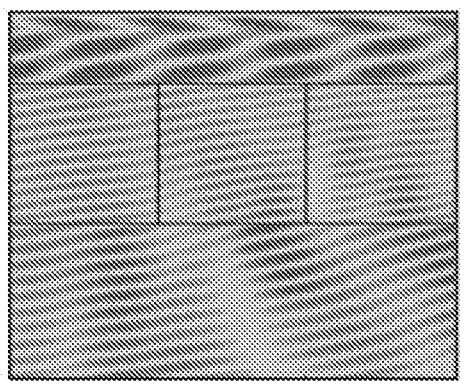
Figure 11C:
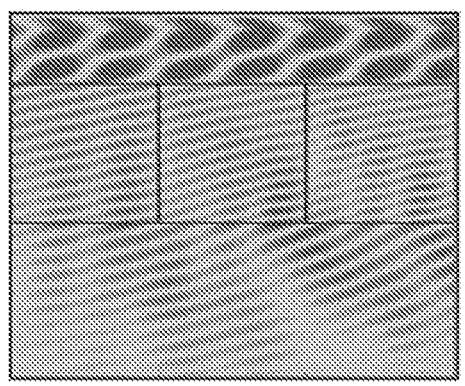

FIG. 10 is a view of a modeled refractive index distribution structure to computationally simulate a function of a compensation area provided in a meta-optical device according to an embodiment, and FIGS. 11A to 11C are views of a phase profile of light incident on the structure of FIG. 10 at an incident angle of 0, 30, and 45 degrees, respectively.

The refractive index distribution structure of FIG. 10 is a distribution in which an effective refractive index changes stepwise to 1.75, $n_c$, and 2 on a substrate having a refractive index of 1.46. As compared with FIG. 8, the refractive index distribution structure of FIG. 10 corresponds to a case in which a portion of an area having a refractive index of 2 is changed to a compensation structure having a refractive index of 1.871.

Comparing FIGS. 11A, 11B, and 11C with FIGS. 9A, 9B, and 9C, respectively, it can be seen that a shadowing effect is reduced.

Figure 12:
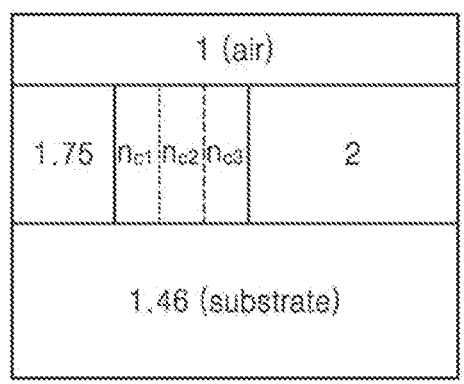
FIG. 12 is a view of a modeled refractive index distribution structure to computationally simulate a function of a compensation area provided in a meta-optical device according to another embodiment.
Figure 13A:
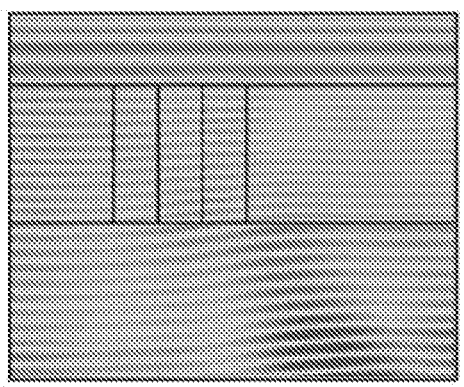
FIGS. 13A to 13C are views of a phase profile of light incident on the structure of FIG. 12 at an incident angle of 0, 30, and 45 degrees, respectively.
Figure 13B:
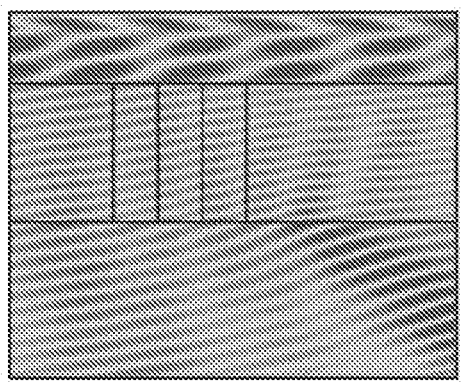
Figure 13C:
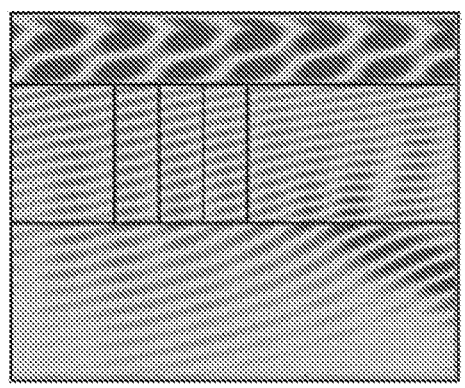

FIG. 12 is a view of a modeled refractive index distribution structure to computationally simulate a function of a compensation area provided in a meta-optical device according to an embodiment, and FIGS. 13A to 13C are views of a phase profile of light incident on the structure of FIG. 12 at an incident angle of 0, 30, and 45 degrees, respectively.

The refractive index distribution structure of FIG. 12 is a distribution in which an effective refractive index changes stepwise to 1.75, nc1, nc2, nc3, and 2 on a substrate having a refractive index of 1.46. As compared with FIG. 8, the refractive index distribution structure of FIG. 12 corresponds to a case in which a portion of an area having a refractive index of 2 is changed to three compensation structures with refractive indices of 1.8125, 1.871, and 1.9375.

Comparing FIGS. 13A, 13B, and 13C with FIGS. 9A, 9B, and 9C, respectively, it can be seen that a shadowing effect is reduced. In addition, comparing FIGS. 13A, 13B, and 13C with FIGS. 11A, 11B, and 11C, respectively, it can be seen that the shadowing effect is significantly reduced when a subdivided compensation structure is introduced.

Figure 14:
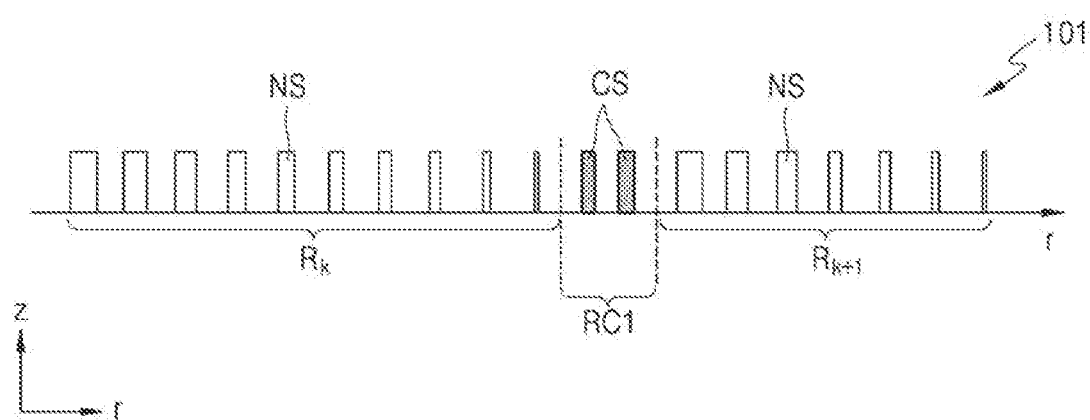
FIG. 14 is a cross-sectional view illustrating a partial area of a structure of a meta-optical device according to another embodiment.

FIG. 14 is a cross-sectional view illustrating a structure of a meta-optical device according to another embodiment in detail in a partial area.

A meta-optical device 101 includes a compensation area RC1 provided between the $k^{th}$ area $R_k$ and the $(k+1)^{th}$ area $R_{k+1}$, and widths of the two compensation structures CS of the compensation area RC1 may increase according to positions of the compensation structures CS in the radial direction. For example, when the compensation structures CS includes a first compensation structure and a second compensation structure, and the first compensation structure is disposed closer to the center C of the meta-optical device 101 than the second compensation structure (i.e., the second compensation structure is disposed farther from the center C than the first compensation structure), a width of the second compensation structure is greater than a width of the first compensation structure. Both the widths of the first and the second compensation structures may be greater than a width of a nanostructure NS closest to the RC1 in the $k^{th}$ area $R_k$, and less than a width of a nanostructure NS closed to the RC in the $(k+1)^{th}$ area $R_{k+1}$.

Figure 15:
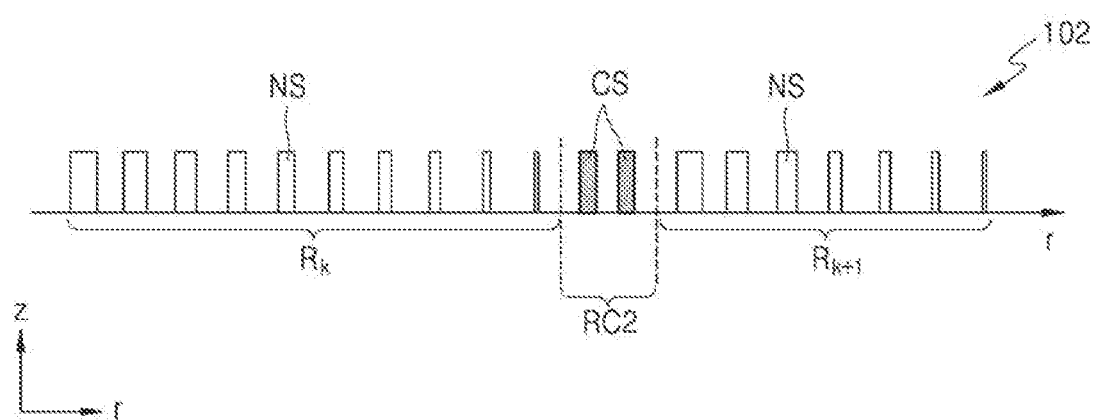
FIG. 15 is a cross-sectional view illustrating a partial area of a structure of a meta-optical device according to another embodiment.

FIG. 15 is a cross-sectional view illustrating a structure of a meta-optical device according to another embodiment in detail in a partial area.

A meta-optical device 102 includes a compensation area RC2 provided between the $k^{th}$ area $R_k$ and the $(k+1)^{th}$ area $R_{k+1}$, and the compensation area RC2 includes the plurality of compensation structures CS having the same width in a radial direction r and arranged in the radial direction r.

Figure 16:
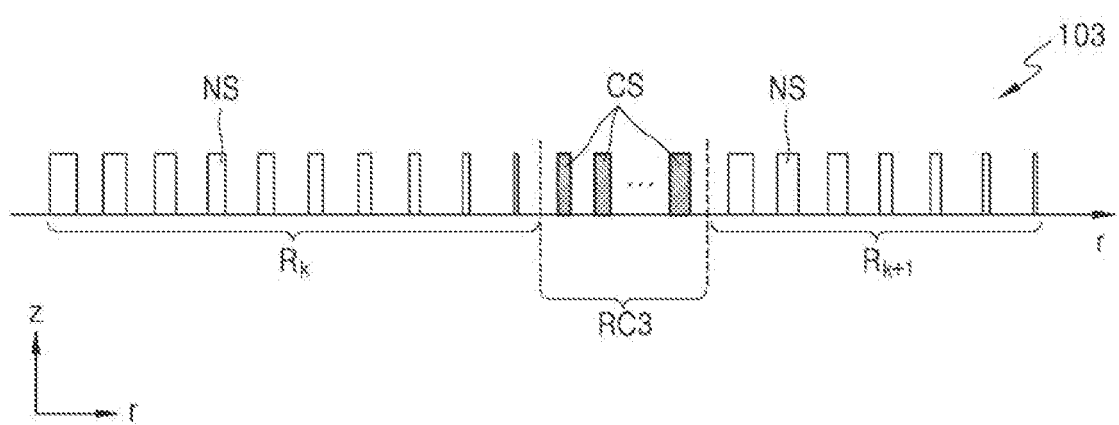
FIG. 16 is a cross-sectional view illustrating a partial area of a structure of a meta-optical device according to another embodiment.

FIG. 16 is a cross-sectional view illustrating a structure of a meta-optical device according to another embodiment in detail in a partial area.

A meta-optical device 103 includes a compensation area RC3 provided between the $k^{th}$ area $R_k$ and the $(k+1)^{th}$ area $R_{k+1}$, and the compensation area RC3 includes the plurality of compensation structures CS arranged in a form in which their width gradually increases in the radial direction (r). The number of compensation structures CS is related to a width of the compensation area RC3, and the width of the compensation area RC3 may be determined considering widths of the $k^{th}$ area $R_k$ and the $(k+1)^{th}$ area $R_{k+1}$ adjacent to the compensation area RC3.

Figure 17:
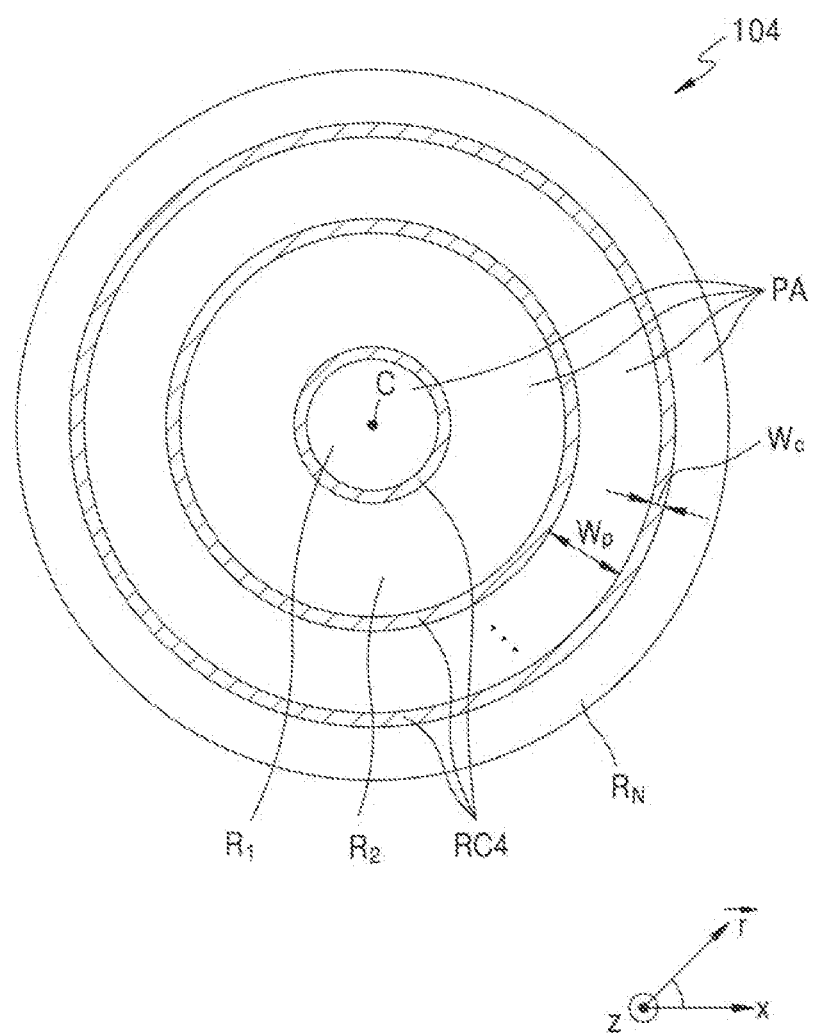
FIG. 17 is a plan view of a structure of a meta-optical device according to another embodiment.

FIG. 17 is a plan view of a structure of a meta-optical device according to another embodiment.

A meta-optical device 104 may include a plurality of compensation areas RC4. A compensation area RC4 may be provided between all adjacent phase modulation areas $R_1, \ldots R_k$, and $\ldots R_N$, but is not limited thereto, and may be provided in some of these areas. A ratio of the number of a plurality of compensation areas to the number of a plurality of phase modulation areas may be approximately 50% or more.

In a phase modulation area PA and a compensation area RC4 at positions adjacent to each other, from among a plurality of phase modulation areas and a plurality of compensation areas, a ratio $(W_c/W_p)$ of a width $W_p$ of a compensation area RC4 to a width $W_p$ of a phase modulation area PA may increase as a position of the compensation area is further away from the center C. As described above, it is considered that the effect of the compensation area RC4 appears well when an incident angle of light is larger. For example, when the meta-optical device 104 functions as a lens, the closer to the center, the closer an incident angle of light is to 0 degrees, and the further away from the center, the larger the incident angle of light. Accordingly, the ratio of the width $W_p$ of the phase modulation area PA and the width $W_p$ of the compensation area RC4 that are located adjacent to each other may be set such that the action of the compensation area RC4 is strengthened toward the periphery. In other words, this ratio may be expressed as a ratio of the number of compensation structures arranged in the compensation area RC4 in the radial direction to the number of nanostructures arranged in the phase modulation area PA in the radial direction.

The ratio $(W_c/W_p)$ gradually increases from the center to the periphery, and may reach about 20% to about 25% at the most periphery. This ratio $(W_p/W_p)$ may increase as an effective aperture ratio (R/f) of the meta-optical device 104 increases, wherein f and R denote a focal length and an effective radius of the meta-optical device 104, respectively. For example, when the effective aperture ratio of the meta-optical device 104 is 0.8, the value of the ratio may be about 25%.

The widths of the compensation area RC4 may be all the same as shown, but are not limited thereto. Any one of the above-described compensation areas RC, RC1, RC2, and RC3 may be applied to the compensation area RC4.

Figure 18:
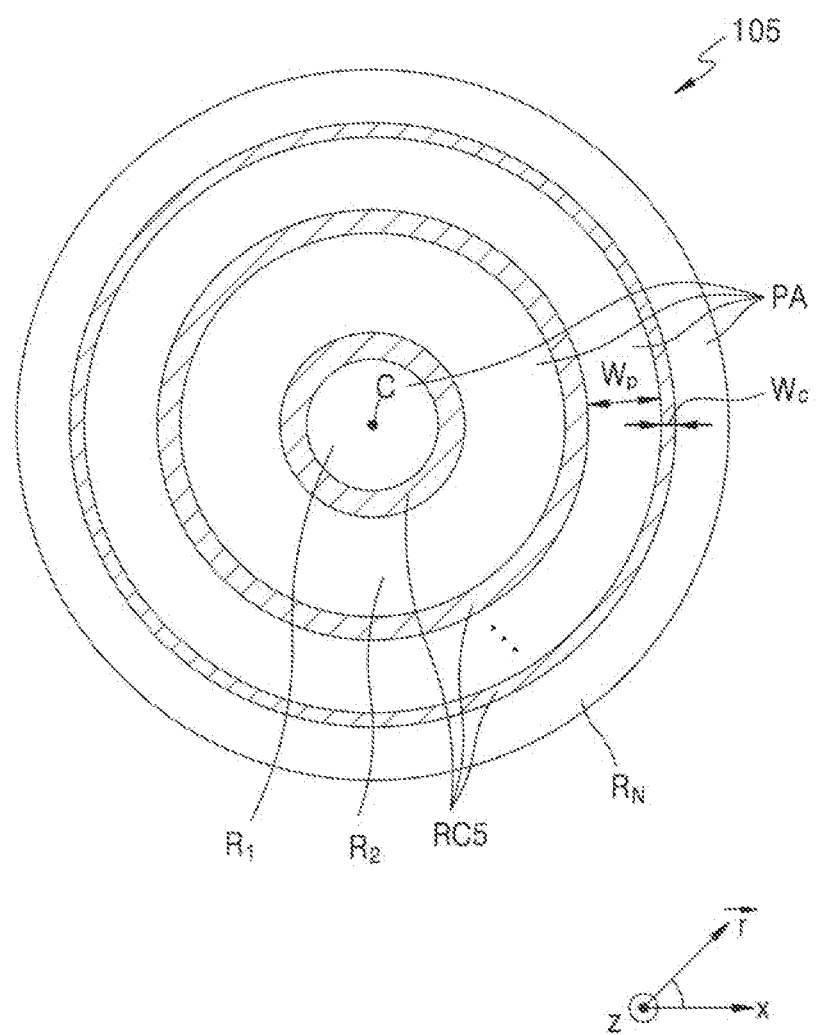
FIG. 18 is a plan view of a structure of a meta-optical device according to another embodiment.

FIG. 18 is a plan view of a structure of a meta-optical device according to another embodiment.

A plurality of compensation areas RC5 may be included in a meta-optical device 105, or may be provided between all the adjacent phase modulation areas $R_1, \ldots R_k$, and $\ldots R_N$, and the width thereof decreases as the distance from the center C increases. As shown, in a case where the width of the first area R1 to the $N^{th}$ area $R_N$ gradually decreases in a direction away from the center C, the width of the compensation areas RC5 may also decrease as the distance from the center C increases. Even in this case, in the phase modulation area PA and the compensation area RC5 at positions adjacent to each other, from among the plurality of phase modulation areas $R_k$ and the plurality of compensation areas RC4, the ratio $(W_p/W_p)$ of the width $W_p$ of the compensation area RC5 to the width $W_p$ of the phase modulation area PA may increase as the position of the compensation area RC5 is further away from the center C. However, the present disclosure is not limited thereto, and the ratio $(W_c/W_p)$ may be constant.

Figure 19:
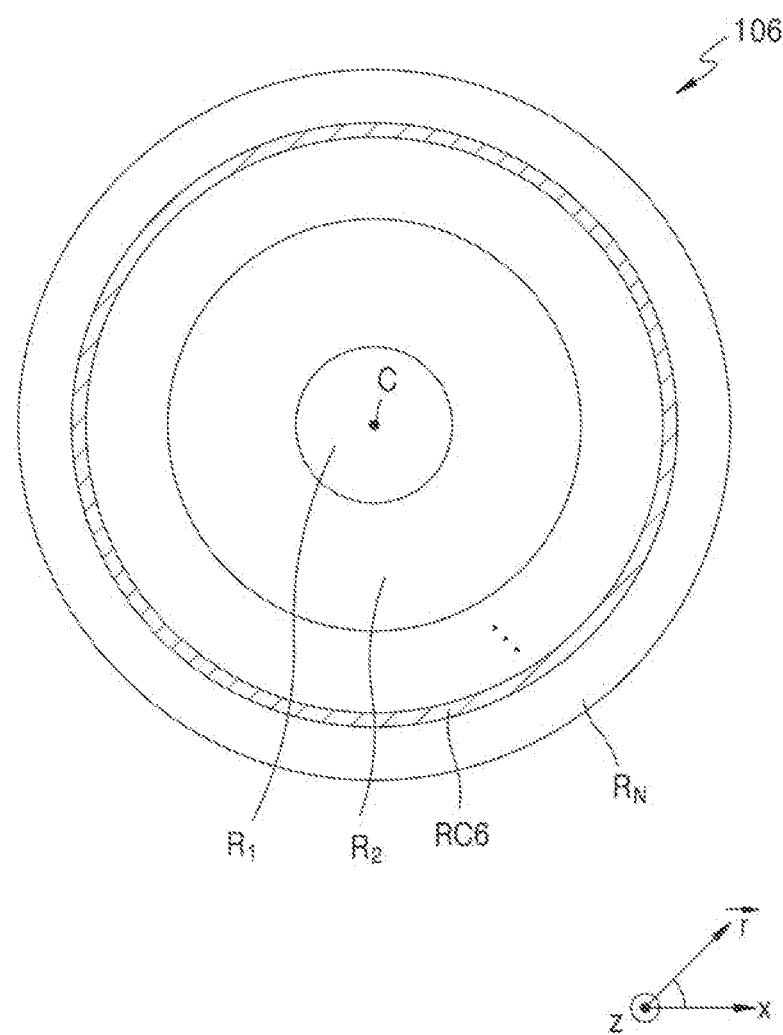
FIG. 19 is a plan view of a structure of a meta-optical device according to another embodiment.

FIG. 19 is a plan view of a structure of a meta-optical device according to another embodiment.

A compensation area RC6 provided in a meta-optical device 106 may be arranged at a peripheral portion among positions between the adjacent phase modulation areas $R_1, \ldots R_k$, and $\ldots R_N$. It is considered that an effect of the compensation area RC6 appears well in an area where an incident angle of light is larger. When the meta-optical device 106 functions as a lens, the closer to the center, the closer an incident angle of light is to 0 degrees, and the further away from the center, the larger the incident angle of light. In order to efficiently represent a function of the compensation area RC6, the compensation area RC6 may be provided on a peripheral side, for example, at a position where the incident angle of light is 30 degrees or more. For example, when an effective radius of the meta-optical device 106 is R, the compensation area RC6 may be provided at a position where the distance from the center is R/2 or more. In this embodiment, the number of compensation areas RC6 is minimized, and diffraction efficiency reduction due to phase discontinuity may be effectively prevented.

Figure 20:
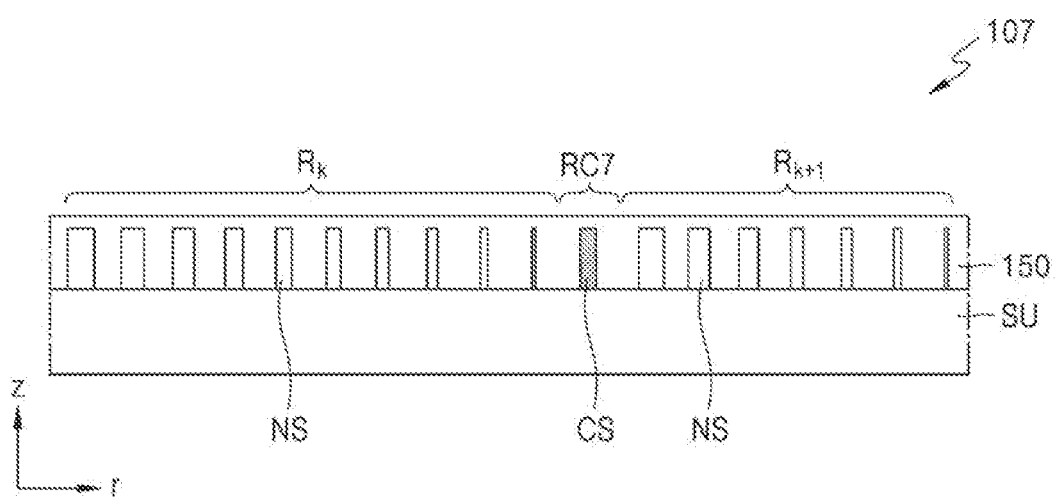
FIG. 20 is a cross-sectional view illustrating a partial area of a structure of a meta-optical device according to another embodiment.

FIG. 20 is a cross-sectional view illustrating a structure of a meta-optical device according to another embodiment in detail in a partial area.

A meta-optical device 107 includes a substrate SU, the nanostructure NS and the compensation structure CS arranged on the substrate SU, and a surrounding material layer 150 covering the nanostructure NS and the compensation structure CS.

The substrate SU has a property of being transparent to light in an operating wavelength band of the meta-optical device 107, and may include any one of glass (fused silica, BK7, etc.), quartz, polymer (PMMA, SU-8, etc.), and other transparent plastics.

The nanostructure NS and the compensation structure CS include a material having a refractive index difference from a surrounding material such as the surrounding material layer 150 and the substrate SU. For example, the material may have a high refractive index with a difference of 0.5 or more from refractive indices of surrounding materials, or a low refractive index with a difference of 0.5 or more from refractive indices of surrounding materials. The nanostructure NS and the compensation structure CS may include a material having the same refractive index.

When the nanostructure NS and the compensation structure CS include a material having a higher refractive index than those of surrounding materials, the nanostructure NS and the compensation structure CS may include at least one of c-Si, p-Si, and a-Si III-V compound semiconductor (GaAs, GaP, GaN, GaAs, etc.), SiC, TiO2, TiSiOx, and SiN, and a low refractive index surrounding material may include a polymer material such as SU-8 and PMMA, $SiO_2$, or SOG.

When the nanostructure NS and the compensation structure CS include a material having a lower refractive index than those of surrounding materials, the nanostructure NS and the compensation structure CS may include $SiO_2$ or air, and a high refractive index surrounding material may include at least one of c-Si, p-Si, and a-Si III-V compound semiconductor (GaAs, GaP, GaN, GaAs, etc.), SiC, $TiO_2$, $TiSiO_x$, and SiN.

Figure 21A:
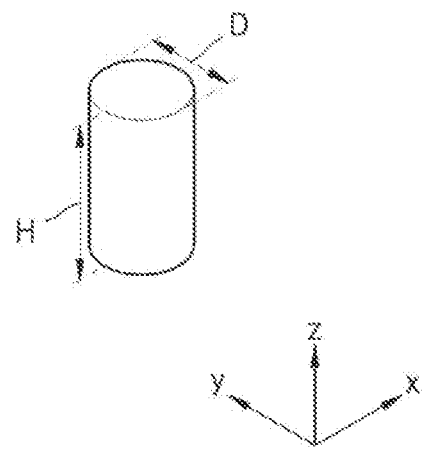
FIGS. 21A and 21B are perspective views of an example of a nanostructure included in a meta-optical device according to embodiments.
Figure 21B:
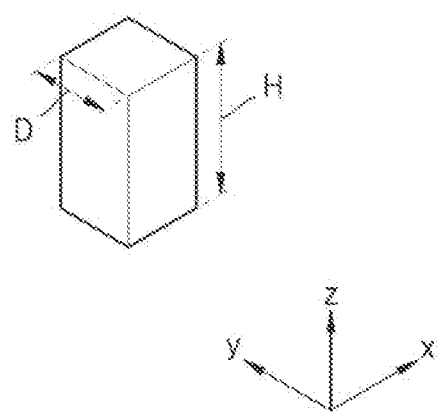

FIGS. 21A and 21B are perspective views of an exemplary form of a nanostructure included in a meta-optical device according to embodiments.

The nanostructure NS and the compensation structure CS may be a columnar structure. For example, the nanostructure NS and the compensation structure CS may have a cylindrical shape as shown in FIG. 21A or a square column shape as shown in FIG. 21B. A width D of the nanostructure NS and the compensation structure CS is a sub-wavelength, and a height H may be greater than the center wavelength $\lambda_0$ of an operating wavelength band. For example, the height H may be greater than $\lambda_0/2$ and less than $4\lambda_0$. In addition to the illustrated shapes, various pillar shapes having a cross-sectional shape of a rectangle, a cross shape, a polygon, or an ellipse may be applied to the nanostructure NS and the compensation structure CS.

Heights of the plurality of nanostructures and the compensation structure may be greater than a center wavelength of the certain wavelength band.

Figure 22:
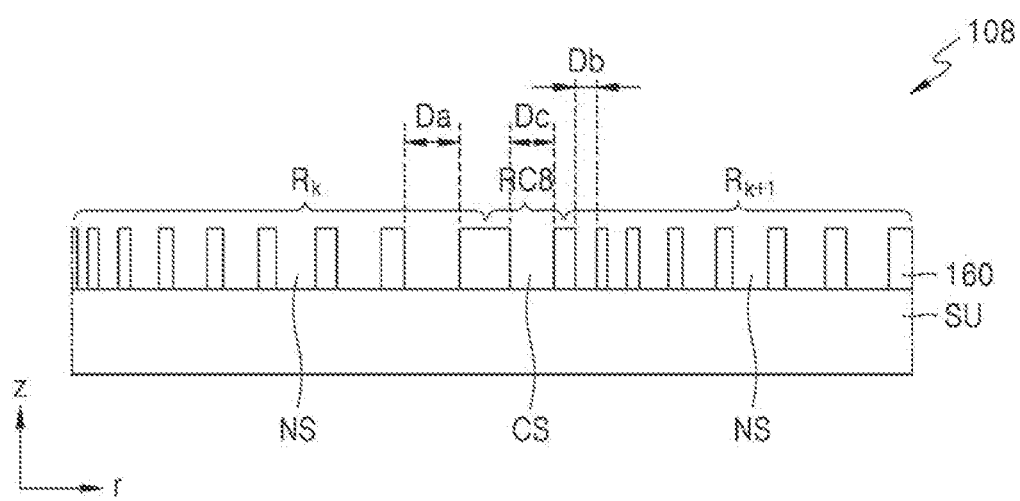
FIG. 22 is a cross-sectional view illustrating a partial area of a structure of a meta-optical device according to another embodiment.

FIG. 22 is a cross-sectional view illustrating a structure of a meta-optical device according to another embodiment in detail in a partial area.

A meta-optical device 108 includes the substrate SU, and the plurality of nanostructures NS and the compensation structure CS formed on the substrate SU.

The nanostructure NS and the compensation structure CS are different from the above-described embodiments in that the surrounding material layer 160 is engraved with a hole of a certain pillar shape, for example, a cylindrical shape as shown in FIG. 21A or a square pillar shape as shown in FIG. 21B.

The width Dc of the hole forming the compensation structure CS has a value between a width $D_a$ of a hole forming the nanostructure NS closest to a compensation area RC8 among the nanostructures NS of the $k^{th}$ area $R_k$ and a width $D_b$ of a hole forming the nanostructure NS closest to the compensation area RC8 among the nanostructures NS of the $(k+1)^{th}$ area $R_{k+1}$.

Figure 23:
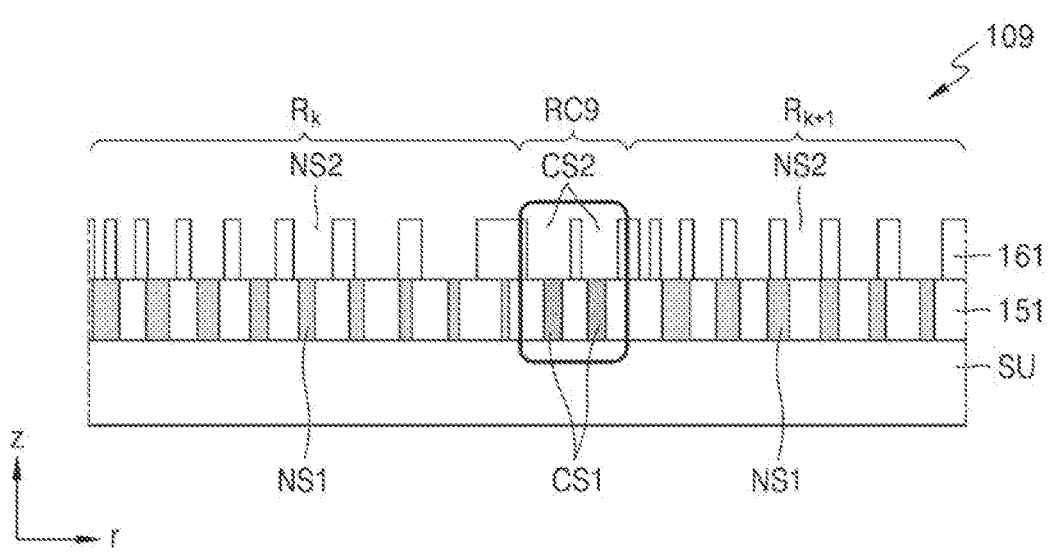
FIG. 23 is a cross-sectional view illustrating a partial area of a structure of a meta-optical device according to another embodiment.

FIG. 23 is a cross-sectional view illustrating a structure of a meta-optical device according to another embodiment in detail in a partial area.

A meta-optical device 109 includes the substrate SU, and a plurality of nanostructures NS1 and NS2 and compensation structures CS1 and CS2 formed on the substrate SU. The meta-optical device 109 of this embodiment is different from the above-described embodiments in that the nanostructures NS1 and NS2 and the compensation structures CS1 and CS2 are arranged in a two-layer structure.

The plurality of nanostructures NS1 and the compensation structure CS1 are arranged on the substrate SU, and a first surrounding material layer 151 covering the plurality of nanostructures NS1 and the compensation structure CS1 is formed. The plurality of nanostructures NS2 and the compensation structure CS2 are formed on the first surrounding material layer 151. A thickness of the first surrounding material layer 151 is shown to match heights of a nanostructure NS1 and the compensation structure CS1, but this is exemplary and is not limited thereto. The thickness of the first surrounding material layer 151 may be greater than the heights of the nanostructure NS1 and the compensation structure CS1. A nanostructure NS2 and the compensation structure CS2 may be formed in a form such that a second surrounding material layer 161 is engraved into a certain pillar shape. A width of the compensation structure CS1 located in a first layer of a compensation area RC9 has a value between widths of two adjacent nanostructures NS1. The compensation structure CS2 located in a second layer of the compensation area RC9 has an intaglio shape, and a width of the hole has a value between widths of holes forming two adjacent nanostructures NS2.

Hereinafter, the description of a multilayer structure will be described as the second layer forming the nanostructure NS2 and the compensation structure CS2 in a form such that a surrounding material layer 161 is engraved, but is not limited thereto. The second layer may also have the nanostructure NS1 and the compensation structure CS1 similar to those of the first layer.

Figure 24:
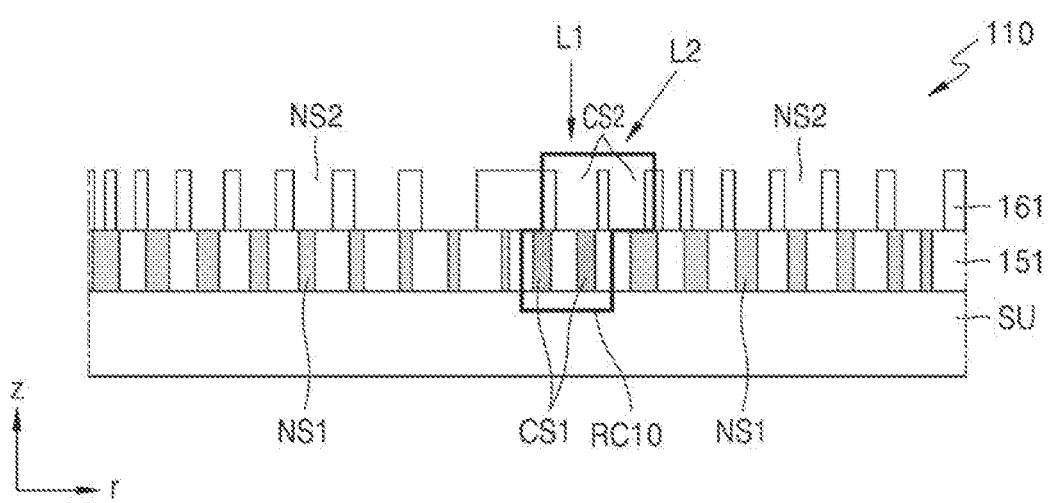
FIG. 24 is a cross-sectional view illustrating a partial area of a structure of a meta-optical device according to another embodiment.

FIG. 24 is a cross-sectional view illustrating a structure of a meta-optical device according to another embodiment in detail in a partial area.

A meta-optical device 110 is similar to the embodiment of FIG. 23 in that the nanostructure NS and the compensation structure CS are arranged in a multilayer structure, and is different from the embodiment of FIG. 23 in that a compensation area RC10 is shifted toward the radial direction r when viewed in the z direction. The compensation area RC10 is formed in this way so that the compensation area RC10 functions well not only for incident light L1 incident at an incident angle of 0 degrees, but also for incident light L2 incident at a certain incident angle.

Figure 25:
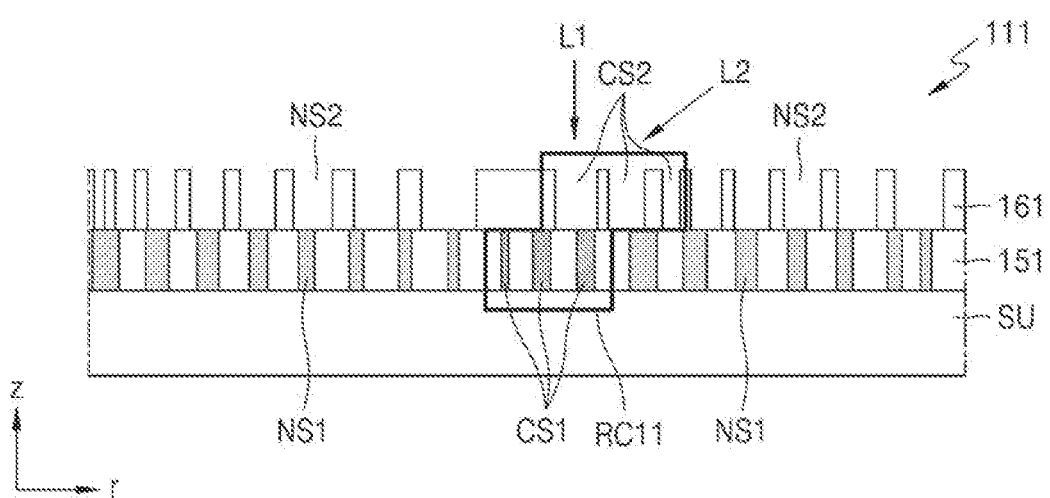
FIG. 25 is a cross-sectional view illustrating a partial area of a structure of a meta-optical device according to another embodiment.

FIG. 25 is a cross-sectional view illustrating a structure of a meta-optical device according to another embodiment in detail in a partial area.

A meta-optical device 111 is similar to the embodiment of FIG. 24 in that the nanostructure NS and the compensation structure CS are arranged in a multilayer structure and a compensation area RC11 is shifted toward the radial direction r when viewed in a stacking direction (the z direction). The degree to which the compensation area RC11 is shifted toward the radial direction r is illustrated to be a little greater than the embodiment of FIG. 23. The compensation area RC11 may function well for the incident light L1 incident at an incident angle of 0 degrees and incident light L3 incident at a larger incident angle.

The embodiment of FIG. 23, the embodiment of FIG. 24, and the embodiment of FIG. 25 may be applied to a meta-optical device of another embodiment. In a position where an incident angle of light is small, the compensation area RC9 may be formed in the shape illustrated in FIG. 23, in a position where the incident angle of light is a little larger, the compensation area RC10 may be formed in the shape illustrated in FIG. 24, and in a position where the incident angle of light is the largest, the compensation area RC11 may be formed in the shape illustrated in FIG. 25.

The above-described meta-optical devices may be applied to various electronic devices. For example, the above-described meta-optical devices may be mounted on electronic devices such as smartphones, wearable devices, Internet of Things (IoT) devices, home appliances, tablet personal computers (PCs), personal digital assistants (PDA), portable multimedia players (PMP), navigation, drones, robots, driverless vehicles, autonomous vehicles, and advanced driver assistance systems (ADAS).

Figure 26:
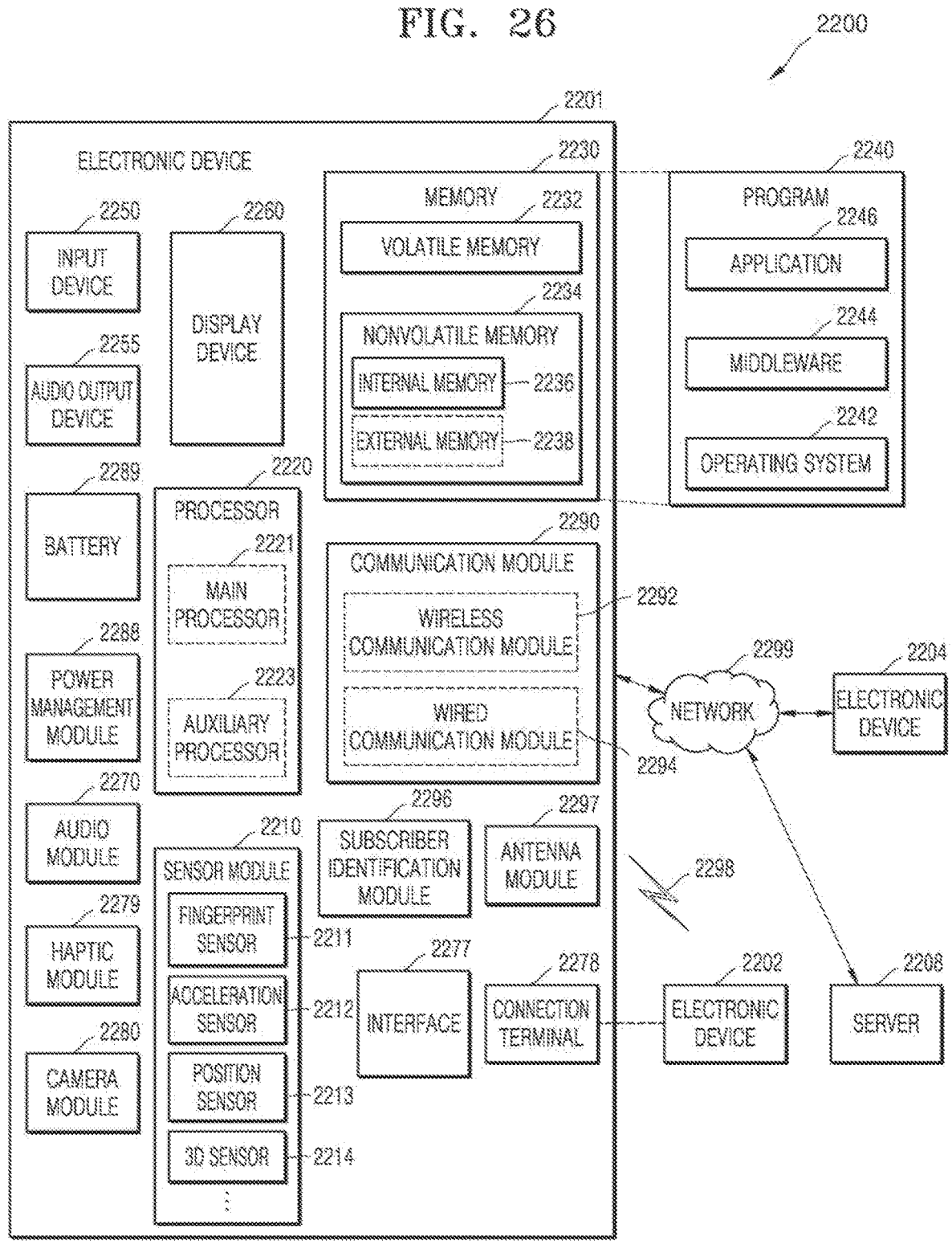
FIG. 26 is a block diagram of a schematic configuration of an electronic device according to an embodiment.

FIG. 26 is a block diagram of a schematic configuration of an electronic device according to an embodiment.

Referring to FIG. 26, in a network environment 2200, an electronic device 2201 may communicate with another electronic device 2202 through a first network 2298 (near-field wireless communication network, etc.), or may communicate with another electronic device 2204 and/or a server 2208 through a second network 2299 (telecommunications network, etc.). The electronic device 2201 may communicate with the electronic device 2204 through the server 2208. The electronic device 2201 may include a processor 2220, a memory 2230, an input device 2250, an audio output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. In the electronic device 2201, some (the display device 2260, etc.) of these components may be omitted, or other components may be added. Some of these components may be implemented in one integrated circuit. For example, a fingerprint sensor 2211 of the sensor module 2210, or an iris sensor, an illuminance sensor, etc. may be implemented by being embedded in the display device 2260 (a display, etc.).

The processor 2220 may execute software (a program 2240, etc.) to control one or more other components (hardware or software components, etc.) of the electronic device 2201 connected to the processor 2220, and may perform a variety of data processing or operations. As a portion of the data processing or operations, the processor 2220 may load instructions and/or data received from other components (the sensor module 2210, the communication module 2290, etc.) into a volatile memory 2232, may process instructions and/or data stored in the volatile memory 2232, and may store result data in a nonvolatile memory 2234. The processor 2220 may include a main processor 2221 (a central processing unit, an application processor, etc.) and an auxiliary processor 2223 (a graphics processing unit, an image signal processor, a sensor hub processor, a communication processor, etc.) that may be operated independently or together. The auxiliary processor 2223 uses less power than the main processor 2221 and may perform specialized functions.

The auxiliary processor 2223 may control functions and/or states related to some (the display device 2260, the sensor module 2210, the communication module 2290, etc.) of the components of the electronic device 2201 on behalf of the main processor 2221 while the main processor 2221 is in an active (e.g., sleep) state or with the main processor 2221 while the main processor 2221 is in an inactive (e.g., application execution) state. The auxiliary processor 2223 (an image signal processor, a communication processor, etc.) may be implemented as a portion of other functionally relevant components (the camera module 2280, the communication module 2290, etc.).

The memory 2230 may store a variety of data required by components (the processor 2220, the sensor module 2276, etc.) of the electronic device 2201. The data may include, for example, software (the program 2240, etc.) and input data and/or output data for commands related thereto. The memory 2230 may include the volatile memory 2232 and/or the nonvolatile memory 2234.

The program 2240 may be stored as software in the memory 2230, and may include an operating system 2242, middleware 2244, and/or an application 2246.

The input device 2250 may receive commands and/or data to be used for the components (the processor 2220, etc.) of the electronic device 2201 from the outside (a user, etc.) of the electronic device 2201. The input device 2250 may include a microphone, mouse, keyboard, and/or digital pen (a stylus pen, etc.).

The audio output device 2255 may output an audio signal to the outside of the electronic device 2201. The audio output device 2255 may include a speaker and/or a receiver. The speaker may be used for general purposes such as multimedia playback or recording playback, and the receiver may be used to receive incoming calls. The receiver may be combined as a portion of the speaker or may be implemented as a separate device.

The display device 2260 may visually provide information to the outside of the electronic device 2201. The display device 2260 may include a display, a hologram device, or a projector, and a control circuit for controlling the devices. The display device 2260 may include a touch circuitry set to sense a touch, and/or a sensor circuit (a pressure sensor, etc.) configured to measure the intensity of force generated by the touch.

The audio module 2270 may convert sound into an electrical signal, or vice versa. The audio module 2270 may obtain sound through the input device 2250, or may output sound through the audio output device 2255 and/or speakers and/or headphones of another electronic device (an electronic device 2102, etc.) directly or wirelessly connected to the electronic device 2201.

The sensor module 2210 may detect an operating state (power, temperature, etc.) of the electronic device 2201 or an external environmental state (user status, etc.), and may generate an electrical signal and/or a data value corresponding to the detected state. The sensor module 2210 may include the fingerprint sensor 2211, an acceleration sensor 2212, a position sensor 2213, a 3D sensor 2214, etc., and may further include an iris sensor, a gyro sensor, an air pressure sensor, a magnetic sensor, a grip sensor, a proximity sensor, a color sensor, an infrared (IR) sensor, a biometric sensor, a temperature sensor, a humidity sensor, and/or an illuminance sensor.

The 3D sensor 2214 senses shape and movement of an object by radiating certain light onto the object and analyzing light reflected by the object, and may include any one of the meta-optical devices 100, 101, 102, 103, 104, 105, and 106 according to the above-described embodiments.

The interface 2277 may support one or more designated protocols, which may be used to directly or wirelessly connect the electronic device 2201 with other electronic devices (the electronic device 2102, etc.). The interface 2277 may include a high definition multimedia interface (HDMI), a universal serial bus (USB) interface, a secure digital (SD) card interface, and/or an audio interface.

A connection terminal 2278 may include a connector through which the electronic device 2201 may be physically connected to other electronic devices (the electronic device 2102, etc.). The connection terminal 2278 may include an HDMI connector, a USB connector, an SD card connector, and/or an audio connector (a headphone connector, etc.).

The haptic module 2279 may convert electrical signals into a mechanical stimulus (vibration, movement, etc.) or an electrical stimulus that the user may perceive through tactile or motor sensations. The haptic module 2279 may include a motor, a piezoelectric element, and/or an electrical stimulation device.

The camera module 2280 may capture a still image and a moving image. The camera module 2280 may include a lens assembly including one or more lenses, image sensors, image signal processors, and/or flashes. The lens assembly included in the camera module 2280 may collect light emitted from an object to be image captured, and may include any one of the meta-optical devices 100-111 according to the above-described embodiments.

The power management module 2288 may manage power supplied to the electronic device 2201. The power management module 388 may be implemented as a portion of a power management integrated circuit PMIC.

The battery 2289 may supply power to components of the electronic device 2201. The battery 2289 may include a non-rechargeable primary battery, a rechargeable secondary battery, and/or a fuel cell.

The communication module 2290 may support establishment of a direct (wired) communication channel and/or a wireless communication channel between the electronic device 2201 and other electronic devices (the electronic device 2102, an electronic device 2104, a server 2108, etc.), and communication through the established communication channel. The communication module 2290 operates independently of the processor 2220 (an application processor, etc.) and may include one or more communication processors supporting direct communication and/or wireless communication. The communication module 2290 may include a wireless communication module 2292 (a cellular communication module, a short-range wireless communication module, a global navigation satellite system (GNSS), etc.) and/or a wired communication module 2294 (a local area network (LAN) communication module, a power line communication module, etc.). The corresponding communication module among these communication modules may communicate with other electronic devices through the first network 2298 (a local area network such as Bluetooth, WiFi Direct, or Infrared Data Association (IrDA)) or the second network 2299 (a telecommunication network such as a cellular network, the Internet, or computer networks (LAN, WAN, etc.)). These various types of communication modules may be integrated into a single component (a single chip, etc.) or may be implemented as a plurality of separate components (multiple chips). The wireless communication module 2292 may identify and authenticate the electronic device 2201 within a communication network such as the first network 2298 and/or the second network 2299 using subscriber information (an international mobile subscriber identifier (IMSI), etc.) stored in the subscriber identity module 2296.

The antenna module 2297 may transmit and/or receive signals and/or power to and/or from the outside (other electronic devices, etc.). An antenna may include a radiator made of a conductive pattern formed on a substrate (PCB, etc.). The antenna module 2297 may include one or more antennas. When a plurality of antenna are included, the communication module 2290 may select an antenna suitable for a communication method used in a communication network, such as the first network 2298 and/or the second network 2299, among the plurality of antennas. Signals and/or power may be transmitted or received between the communication module 2290 and other electronic devices through the selected antenna. Other components (RFIC, etc.) besides the antenna may be included as a portion of the antenna module 2297.

Some of the components may be connected to each other and exchange signals (command, data, etc.) through a communication method between peripheral devices (a bus, general purpose input and output (GPIO), a serial peripheral interface (SPI), a mobile industry processor interface (MIPI), etc.).

Commands or data may be transmitted or received between the electronic device 2201 and the external electronic device 104 through the server 2108 connected to the second network 2299. The other electronic devices 2202 and 2204 may be the same as or different from the electronic device 2201. All or some of the operations executed in the electronic device 2201 may be executed in one or more of the other electronic devices 2202, 2204, and 2208. For example, when the electronic device 2201 needs to perform certain functions or services, the electronic device 2201 may request one or more other electronic devices to perform some or all of the functions or services instead of directly executing the functions or services. One or more other electronic devices that have received the request may execute an additional function or service related to the request, and may transfer a result of the execution to the electronic device 2201. To this end, cloud computing, distributed computing, and/or client-server computing technologies may be used.

Figure 27:
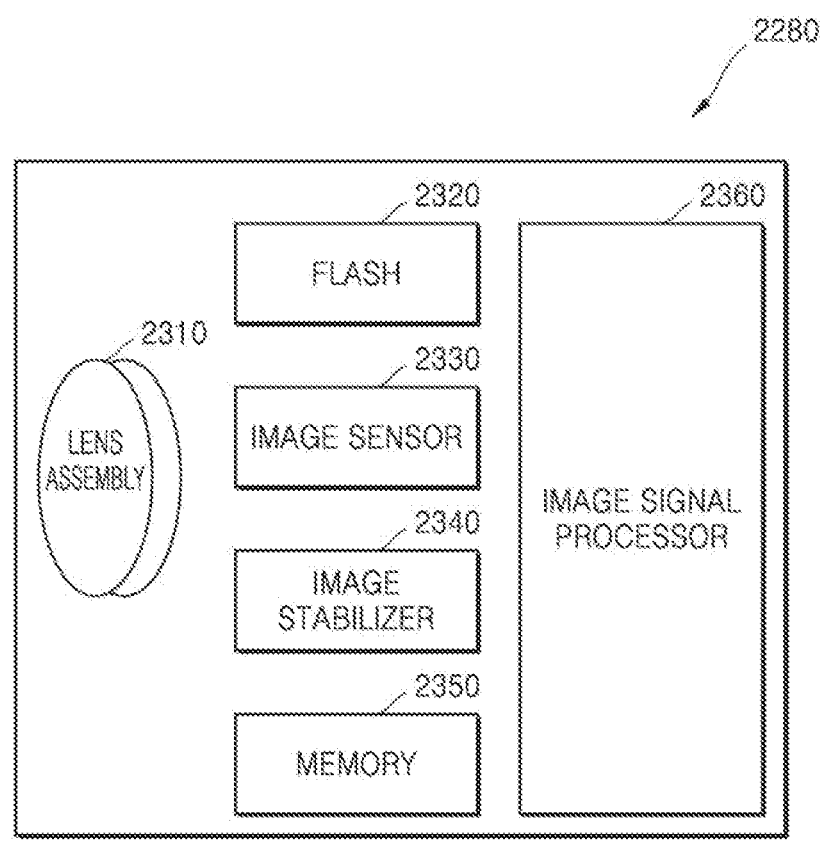
FIG. 27 is a block diagram of a schematic configuration of a camera module included in the electronic device of FIG. 26 according to an embodiment.

FIG. 27 is a block diagram of a schematic configuration of a camera module included in the electronic device of FIG. 26.

Referring to FIG. 27, the camera module 2280 may include a lens assembly 2310, a flash 2320, an image sensor 2330, an image stabilizer 2340, a memory 2350 (a buffer memory, etc.), and/or an image signal processor 2360. The lens assembly 2310 may collect light emitted from an object to be image captured, and may include any one of the meta-optical devices 100-111. The lens assembly 2310 may include one or more refractive lenses and a meta-optical device. The meta-optical device provided therein may be designed as a lens having a certain phase profile and having a compensation structure to reduce phase discontinuity. The lens assembly 2310 including such a meta-optical device implements desired optical performance and may have a short optical length.

In addition, the camera module 2280 may further include an actuator. The actuator may drive a position of lens elements constituting the lens assembly 2310 for zooming and/or autofocus (AF), and may adjust a separation distance between the lens elements.

The camera module 2280 may include a plurality of lens assemblies 2310, and in this case, may be a dual camera, a 360-degree camera, or a spherical camera. Some of the plurality of lens assemblies 2310 may have the same lens properties (angle of view, focal length, autofocus, F Number, optical zoom, etc.) or different lens properties. The lens assembly 2310 may include a wide-angle lens or a telephoto lens.

The flash 2320 may emit light used to enhance light emitted or reflected from an object. The flash 2320 may include one or more light emitting diodes (red-green-blue (RGB) LED, white LED, infrared LED, ultraviolet LED, etc.), and/or a xenon lamp. The image sensor 2330 may be the image sensor 1200 described with reference to FIGS. 1, 5 and 7, and may obtain an image corresponding to the object by converting light emitted or reflected from the object and transferred through the lens assembly 2310 into an electrical signal. The image sensor 2330 may include one or a plurality of sensors selected from image sensors having different attributes, such as an RGB sensor, a black and white (BW) sensor, an IR sensor, or a UV sensor. Each of the sensors included in the image sensor 2330 may be implemented as a charged coupled device (CCD) sensor and/or a complementary metal oxide semiconductor (CMOS) sensor.

The image stabilizer 2340 may move one or a plurality of lenses or the image sensor 2330 included in the lens assembly 2310 in a specific direction in response to movement of the camera module 2280 or an electronic device 2301 including the same, or may control an operating characteristic of the image sensor 2330 (adjustment of read-out timing, etc.) such that a negative effect due to movement is compensated. The image stabilizer 2340 may detect movement of the camera module 2280 or the electronic device 2301 using a gyro sensor or an acceleration sensor arranged inside or outside the camera module 2280. The image stabilizer 2340 may be implemented optically.

In the memory 2350, some or all of the data obtained through the image sensor 2330 may be stored for the next image processing operation. For example, when a plurality of images are obtained at high speed, the obtained original data (Bayer-patterned data, high-resolution data, etc.) may be stored in the memory 2350 and only a low-resolution image is displayed, and then the memory 2350 may be used to transfer the original data of a selected image (user selection, etc.) may be transferred to the image signal processor 2360. The memory 2350 may be integrated into the memory 2230 of the electronic device 2201 or may be configured as a separate memory that is independently operated.

The image signal processor 2360 may perform one or more image processes on an image obtained through the image sensor 2330 or image data stored in the memory 2350. The one or more image processes may include depth map generation, three-dimensional modeling, panorama generation, feature point extraction, image synthesis, and/or image compensation (noise reduction, resolution adjustment, brightness adjustment, blurring, sharpening, softening, etc.). The image signal processor 2360 may control (exposure time control, or read-out timing control, etc.) components (the image sensor 2330, etc.) included in the camera module 2280. An image processed by the image signal processor 2360 may be stored again in the memory 2350 for further processing or may be provided to external components (the memory 2230, the display device 2260, the electronic device 2202, the electronic device 2204, the server 2208, etc.) of the camera module 2280. The image signal processor 2360 may be integrated into the processor 2220 or may be configured as a separate processor that operates independently of the processor 2220. When the image signal processor 2360 is configured as a separate processor from the processor 2220, an image processed by the image signal processor 2360 may be displayed through the display device 2260 after further image processing by the processor 2220.

The electronic device 2201 may include a plurality of camera modules 2280 having respective attributes or functions. In this case, one of the plurality of camera modules 2280 may be a wide-angle camera, and the other may be a telephoto camera. Similarly, one of the plurality of camera modules 2280 may be a front camera, and the other may be a rear camera.

Figure 28:
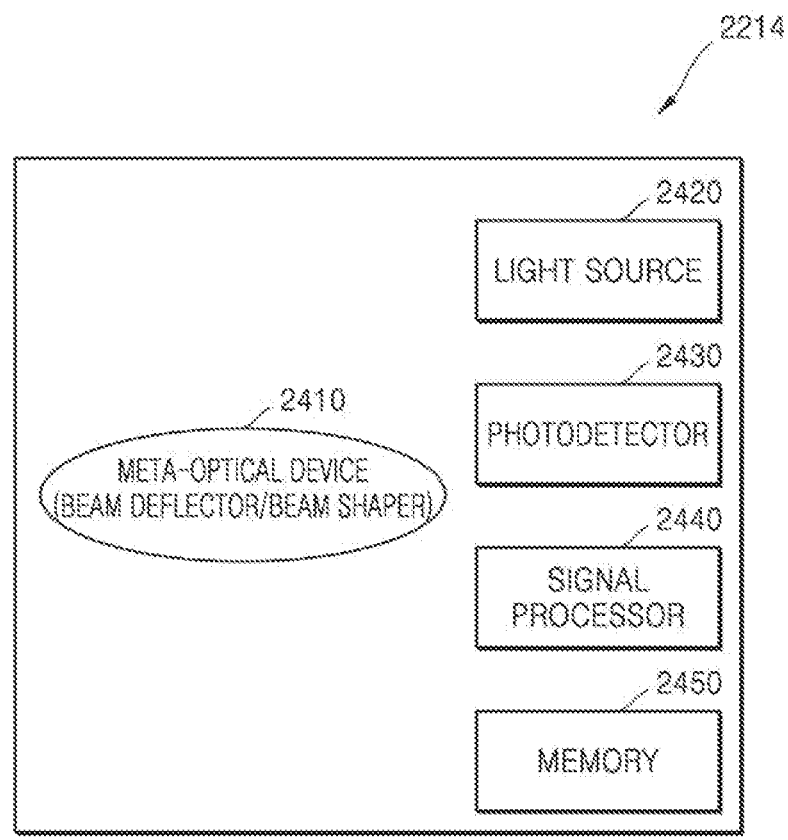
FIG. 28 is a block diagram of a schematic configuration of a 3D sensor provided in the electronic device of FIG. 26 according to an embodiment.

FIG. 28 is a block diagram of a schematic configuration of a three-dimensional (3D) sensor provided in the electronic device of FIG. 26.

The 3D sensor 2214 radiates certain light onto an object and receives and analyzes light reflected by the object to sense shape and movement of the object. The 3D sensor 2214 includes a light source 2420, a meta-optical device 2410, a photodetector 2430, a signal processor 2440, and a memory 2450. As the meta-optical device 2410, any one of the meta-optical devices 100-111 according to the above-described embodiments may be employed, and a target phase delay profile may be set to function as a beam deflector or a beam shaper.

The light source 2420 radiates light to be used for analyzing the shape or position of an object. The light source 2420 may include a light source that generates and radiates light having a small wavelength. The light source 2420 may include a light source such as a laser diode (LD), a light emitting diode (LED), a super luminescent diode (SLD) that generates and radiates light in a wavelength band suitable for analysis of the position and shape of an object, for example, light in an infrared band wavelength. The light source 2420 may be a laser diode of a variable wavelength. The light source 2420 may generate and irradiate light of a plurality of different wavelength bands. The light source 2420 may generate and radiate pulsed light or continuous light.

The meta-optical device 2410 modulates light radiated from a light source 1100 and transmits the modulated light to an object. When the meta-optical device 2410 is a beam deflector, the meta-optical device 2410 may deflect incident light in a certain direction to direct the incident light toward an object. When the meta-optical device 2410 is a beam shaper, the meta-optical device 2410 modulates incident light such that the incident light has distribution having a certain pattern. The meta-optical device 2410 may form structured light suitable for 3D shape analysis.

The photodetector 2430 receives reflected light of light radiated onto the object through the meta-optical device 2410. The photodetector 2430 may include an array of a plurality of sensors for sensing light, or may include only one sensor.

The signal processor 2440 may analyze a shape of the object by processing a signal sensed by the photodetector 2430. The signal processor 2440 may analyze a 3D shape including a depth position of the object. The signal processor 2440 may be integrated into the processor 2220 shown in FIG. 26.

For the 3D shape analysis, an operation for measuring an optical flight time may be performed. Various calculation methods may be used to measure the optical flight time. For example, in a direct time measurement method, a distance is obtained by projecting pulsed light onto an object and measuring the time when the light is reflected and returned to the object with a timer. In a correlation method, pulsed light is projected onto an object and a distance is measured from brightness of the light reflected by the object and returned. In a phase delay measurement method, a continuous wave light such as a sine wave is projected onto an object, and a phase difference of the light reflected and returned is detected and converted into a distance.

When an object is irradiated with structured light, a depth position of the object may be calculated from a pattern change of the structured light reflected by the object, that is, a result of comparison with an incident structured light pattern. Depth information of the object may be extracted by tracking a pattern change for each coordinate of the structured light reflected by the object, and 3D information related to shape and movement of the object may be extracted from the depth information of the object.

The memory 2450 may store programs and other data necessary for the operation of the signal processor 2440.

An operation result of the signal processor 2440, that is, information about shape and position of the object may be transmitted to another unit in the electronic device 2301 or to another electronic device. For example, this information may be used in the application 2246 stored in the memory 2230. Another electronic device to which a result is transmitted may be a display device or a printer that outputs the result. In addition, the electronic device may be self-driving devices such as driverless cars, autonomous vehicles, robots, drones, etc., smart phones, smart watches, mobile phones, PDAs, laptop computers, PCs, various wearable devices, other mobile or non-mobile computing devices, and IoT devices, but is not limited thereto.

Figure 29:
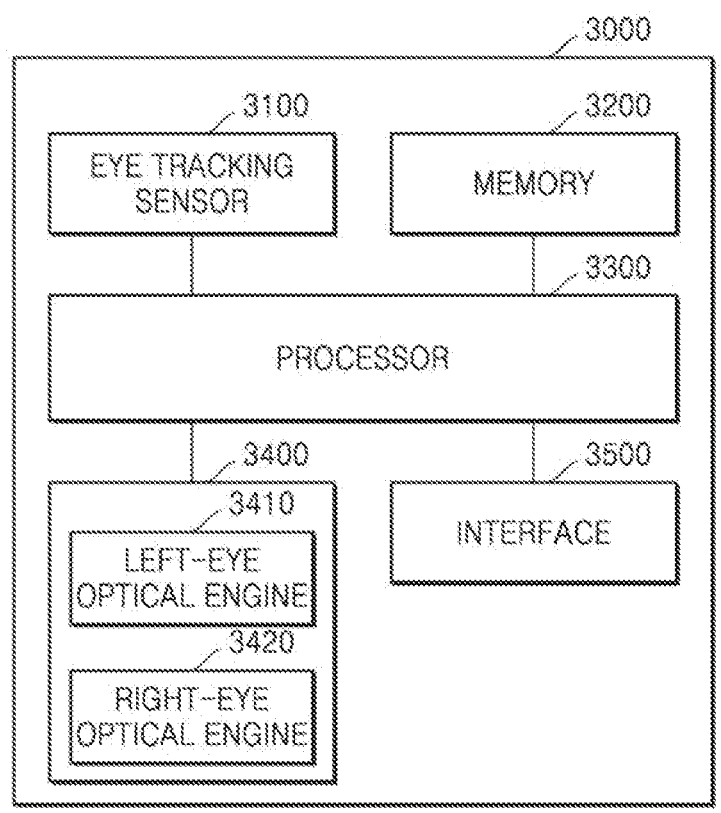
FIG. 29 is a block diagram of a schematic configuration of an electronic device according to another embodiment.

FIG. 29 is a block diagram of a schematic configuration of an electronic device according to another embodiment.

An electronic device 3000 of FIG. 29 may be a glasses-type augmented reality device. The electronic device 3000 includes a display engine 3400, a processor 3300, an eye-tracking sensor 3100, an interface 3500, and a memory 3200.

The processor 3300 may control the overall operation of an augmented reality device including the display engine 3400 by driving an operating system or an application program, and may process and calculate a variety of data including image data. For example, the processor 3300 may process image data including a left-eye virtual image and a right-eye virtual image rendered to have binocular parallax.

The interface 3500 is input/output of data or manipulation commands from the outside, and may include, for example, a user interface such as a touch pad, a controller, and manipulation buttons that a user can manipulate. The interface 3500 may include a wired communication module such as a USB module or a wireless communication module such as Bluetooth, and may receive operation information of a user or data of a virtual image transmitted from an interface included in an external device through them.

The memory 3200 may include an internal memory such as volatile memory or nonvolatile memory. The memory 3200 may store a variety of data, programs, or applications for driving and controlling an augmented reality device under the control of the processor 3300 and data of input/output signals or virtual images.

The display engine 3400 is configured to generate light of a virtual image by receiving image data generated by the processor 3300, and includes a left-eye optical engine 3410 and a right-eye optical engine 3420. Each of the left-eye optical engine 3410 and the right-eye optical engine 3420 includes a light source that outputs light and a display panel that forms a virtual image using light output from the light source, and has the same function as a small projector. The light source may be implemented with, for example, an LED, and the display panel may be implemented with, for example, Liquid Crystal on Silicon (LCoS).

The eye-tracking sensor 3100 may be mounted at a position where the pupil of a user wearing an augmented reality device can be tracked, and may transmit a signal corresponding to user's gaze to the processor 3300. The eye-tracking sensor 3100 may detect gaze information such as a gaze direction toward the user's eye, a pupil position of the user's eye, or coordinates of a center point of the pupil. The processor 3300 may determine a shape of eye movement based on the user's gaze information detected by the eye-tracking sensor 3100. For example, the processor 3300, based on gaze information obtained from an eye-tracking sensor, may determine various types of eye movement, including fixation to look at any one place, pursuit to follow moving objects, a saccade in which the gaze moves quickly from one gaze point to another.

Figure 30:
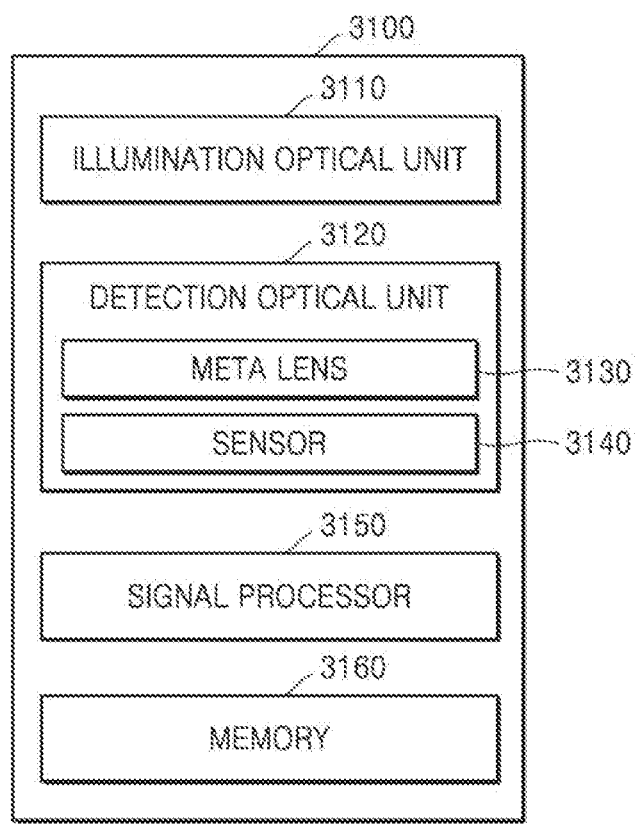
FIG. 30 is a block diagram of a schematic configuration of an eye-tracking sensor provided in the electronic device of FIG. 29 according to an embodiment.

FIG. 30 is a block diagram of a schematic configuration of an eye-tracking sensor provided in the electronic device of FIG. 29.

The eye-tracking sensor 3100 includes an illumination optical unit 3110, a detection optical unit 3120, a signal processor 3150, and a memory 3160. The illumination optical unit 3110 may include a light source that radiates light, for example, infrared light at a position of an object (user's eye). The detection optical unit 3120 detects reflected light and may include a meta lens 3130 and a sensor 3140. The signal processor 3150 calculates a pupil position of the user's eye from a result of sensing by the detection optical unit 3120.

As the meta lens 3130, any one or a combination or modified example of the meta-optical devices according to the above-described embodiments may be used. The meta lens 3130 may condense light from the object to the sensor 3140. An incident angle of light incident on the sensor 3140 in the eye-tracking sensor 3100 located very close to the user's eyes may be, for example, about 30 degrees or more. The meta lens 3130 has a structure including a compensation area, and efficiency degradation is reduced even for light having a larger incident angle. Therefore, the accuracy of eye tracking may be improved.

The above-described meta-optical device may exhibit high diffraction efficiency because discontinuity of a phase profile is reduced.

The above-described meta-optical device may exhibit good diffraction efficiency even for incident light having a larger incident angle.

The above-described meta-optical device may be used as a lens, a beam deflector, a beam shaper, and the like, and may be employed in various electronic devices utilizing these.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A meta-optical device comprising:
   a plurality of phase modulation areas arranged in a first direction and configured to modulate a phase of an incident light, each of the plurality of phase modulation areas comprising a plurality of nanostructures; and
   a compensation area located between a $k^{th}$ phase modulation area and a $(k+1)^{th}$ phase modulation area adjacent to each other, from among the plurality of phase modulation areas, and comprising a compensation structure,
   wherein N is a number of the plurality of phase modulation areas, k and N are natural numbers, and k is equal to or greater than 1 and less than N,
   wherein the plurality of phase modulation areas have a circular shape or an annular shape surrounding the circular shape, and the first direction is a radial direction that extends from a center of the circular shape toward a boundary of the meta-optical device, and
   wherein sizes of the plurality of nanostructures in the $k^{th}$ phase modulation area change according to a first pattern in the radial direction, sizes of the plurality of nanostructures in the $(k+1)^{th}$ phase modulation area change according to a second pattern in the radial direction, and a size of the compensation structure located between the $k^{th}$ phase modulation area and the (k+1)$^{th}$ phase modulation area does not follow the first pattern and the second pattern.

2. The meta-optical device of claim 1, wherein the k$^{th}$ phase modulation area and the (k+1)$^{th}$ phase modulation area are configured to modulate the phase of the incident light to have a same sign of a phase change slope according to a position in the first direction.

3. The meta-optical device of claim 2, wherein,
among the plurality of nanostructures in the k$^{th}$ phase modulation area, a width of a nanostructure closest to the compensation area in the first direction is $w_a$,
among the plurality of nanostructures in the (k+1)$^{th}$ phase modulation area, a width of a nanostructure closest to the compensation area in the first direction is $w_b$, and
a width $w_c$ of the compensation structure is between $w_a$ and $w_b$.

4. The meta-optical device of claim 3, wherein the compensation structure comprises two or more compensation structures having a same width in the first direction and arranged in the first direction.

5. The meta-optical device of claim 3, wherein the compensation structure comprises two or more compensation structures arranged in the first direction, and
wherein widths of the two or more compensation structures gradually change with a pattern of change from $w_a$ to $w_b$ in the first direction.

6. The meta-optical device of claim 1, wherein, when the plurality of phase modulation areas are m$^{th}$ areas, and m is greater than or equal to 2 and increases from 2 to N in an order from the center, all of the m$^{th}$ areas have a phase modulation range of a first phase to a second phase in the radial direction, and
the first phase and the second phase are different from each other and are between $-2\pi$ and $2\pi$.

7. The meta-optical device of claim 6, wherein a difference between the first phase and the second phase is $2\pi$ or less.

8. The meta-optical device of claim 1, wherein widths of the plurality of phase modulation areas in the radial direction decrease in a direction from the center to the boundary of the meta-optical device.

9. The meta-optical device of claim 1, wherein
the compensation area comprises a plurality of compensation areas, and
widths of the plurality of compensation areas that are arranged in the radial direction have a same value or decrease in a direction from the center to the boundary of the meta-optical device.

10. The meta-optical device of claim 1, wherein
the compensation area comprises a plurality of compensation areas, and
in a phase modulation area and a compensation area at a position adjacent to each other, from among the plurality of phase modulation areas and the plurality of compensation areas, a ratio of a width of the compensation area to a width of the phase modulation area increases in a direction from the center to the boundary of the meta-optical device.

11. The meta-optical device of claim 10, wherein the ratio is 25% or less.

12. A meta-optical device of claim 1, wherein the compensation area comprises a plurality of compensation areas, and
a ratio of a number of the plurality of compensation areas to a number of the plurality of phase modulation areas is 50% or more.

13. The meta-optical device of claim 1, wherein, when a radius of the meta-optical device is R, a distance of the compensation area from the center is greater than R/2.

14. The meta-optical device of claim 1, wherein, when an incident angle of the incident light is θ, the compensation area is provided at a position where θ is greater than or equal to 30°.

15. The meta-optical device of claim 1, wherein the plurality of nanostructures and the compensation structure are arranged in a multilayer structure stacked in a second direction perpendicular to the first direction.

16. An electronic device comprising:
a lens assembly comprising one or more refractive and a meta-optical device; and
an image sensor configured to convert an optical image formed by the lens assembly into an electrical signal,
wherein the meta-optical device comprises:
a plurality of phase modulation areas arranged in a first direction and configured to modulate a phase of an incident light, each of the plurality of phase modulation areas comprising a plurality of nanostructures; and
a compensation area located between a k$^{th}$ phase modulation area and a (k+1)$^{th}$ phase modulation area adjacent to each other, from among the plurality of phase modulation areas, and comprising a compensation structure,
wherein N is a number of the plurality of phase modulation areas, k and N are natural numbers, and k is equal to or greater than 1 and less than N,
wherein the plurality of phase modulation areas have a circular shape or an annular shape surrounding the circular shape, and the first direction is a radial direction that extends from a center of the circular shape toward a boundary of the meta-optical device, and
wherein sizes of the plurality of nanostructures in the k$^{th}$ phase modulation area change according to a first pattern in the radial direction, sizes of the plurality of nanostructures in the (k+1)$^{th}$ phase modulation area change according to a second pattern in the radial direction, and a size of the compensation structure located between the k$^{th}$ phase modulation area and the (k+1)$^{th}$ phase modulation area does not follow the first pattern and the second pattern.

17. An electronic device comprising:
a light source configured to emit light toward an object;
a meta-optical device configured to modulate light radiated from the light source and transmit the modulated light to an object;
a photodetector configured to receive light form the object; and
a processor configured to analyze a shape of the object by processing a signal sensed by the photodetector,
wherein the meta-optical device comprises:
a plurality of phase modulation areas arranged in a first direction and configured to modulate a phase of an incident light, each of the plurality of phase modulation areas comprising a plurality of nanostructures; and
a compensation area located between a k$^{th}$ phase modulation area and a (k+1)$^{th}$ phase modulation area adjacent to each other, from among the plurality of phase modulation areas, and comprising a compensation structure,
wherein Nis a number of the plurality of phase modulation areas, k and N are natural numbers, and k is equal to or greater than 1 and less than N,
wherein the plurality of phase modulation areas have a circular shape or an annular shape surrounding the circular shape, and the first direction is a radial direction that extends from a center of the circular shape toward a boundary of the meta-optical device, and wherein sizes of the plurality of nanostructures in the $k^{th}$ phase modulation area change according to a first pattern in the radial direction, sizes of the plurality of nanostructures in the $(k+1)^{th}$ phase modulation area change according to a second pattern in the radial direction, and a size of the compensation structure located between the $k^{th}$ phase modulation area and the $(k+1)^{th}$ phase modulation area does not follow the first pattern and the second pattern.

18. The meta-optical device of claim 17, wherein the plurality of nanostructures comprise a plurality of first nanostructures arranged on a first layer and a plurality of second nanostructures arranged on a second layer, the compensation structure comprises a first compensation structure arranged on the first layer and a second compensation structure arranged on the second layer, and when viewed from the second direction, the first compensation structure and the second compensation structure are arranged to be offset with respect to each other in the first direction.

19. The meta-optical device of claim 18, wherein a length in the first direction in which the first compensation structure and the second compensation structure are offset from each other increases as a position of the compensation area becomes farther away from the center.

20. An electronic device comprising:
a display engine;
an eye-tracking sensor configured to detect gaze information, the eye-tracking sensor including a meta-lens;
a processor configured to control the display engine based on detected gaze information from the eye-tracking sensor;

wherein the meta-lens comprises;

a plurality of phase modulation areas arranged in a first direction and configured to modulate a phase of an incident light, each of the plurality of phase modulation areas comprising a plurality of nanostructures; and a compensation area located between a $k^{th}$ phase modulation area and a $(k+1)^{th}$ phase modulation area adjacent to each other, from among the plurality of phase modulation areas, and comprising a compensation structure, wherein N is a number of the plurality of phase modulation areas, k and N are natural numbers, and k is equal to or greater than 1 and less than N, wherein the plurality of phase modulation areas have a circular shape or an annular shape surrounding the circular shape, and the first direction is a radial direction that extends from a center of the circular shape toward a boundary of the meta-optical device, and wherein sizes of the plurality of nanostructures in the $k^{th}$ phase modulation area change according to a first pattern in the radial direction, sizes of the plurality of nanostructures in the $(k+1)^{th}$ phase modulation area change according to a second pattern in the radial direction, and a size of the compensation structure located between the $k^{th}$ phase modulation area and the $(k+1)^{th}$ phase modulation area does not follow the first pattern and the second pattern.

* * * * *